US009679535B2

(12) United States Patent
Sakaigawa et al.

(10) Patent No.: US 9,679,535 B2
(45) Date of Patent: Jun. 13, 2017

(54) DISPLAY DEVICE AND DISPLAY CONTROL METHOD

(71) Applicant: Japan Display Inc., Tokyo (JP)

(72) Inventors: Akira Sakaigawa, Tokyo (JP); Toshiyuki Nagatsuma, Tokyo (JP); Amane Higashi, Tokyo (JP); Masaaki Kabe, Tokyo (JP)

(73) Assignee: Japan Display Inc., Tokyo (JP)

( * ) Notice: Subject to any disclaimer, the term of this patent is extended or adjusted under 35 U.S.C. 154(b) by 73 days.

(21) Appl. No.: 14/684,654

(22) Filed: Apr. 13, 2015

(65) Prior Publication Data

US 2015/0294441 A1 Oct. 15, 2015

(30) Foreign Application Priority Data

Apr. 15, 2014 (JP) ................................ 2014-084048

(51) Int. Cl.

| | |
|---|---|
| ***G09G 5/02*** | (2006.01) |
| ***G09G 5/10*** | (2006.01) |
| ***G09G 3/34*** | (2006.01) |
| ***G06T 5/00*** | (2006.01) |
| ***G06T 11/00*** | (2006.01) |
| ***H04N 1/60*** | (2006.01) |
| ***H04N 5/202*** | (2006.01) |
| ***H04N 5/58*** | (2006.01) |

(Continued)

(52) U.S. Cl.

CPC ............. *G09G 5/10* (2013.01); *G09G 3/3413* (2013.01); *G09G 2300/0452* (2013.01); *G09G 2320/0276* (2013.01); *G09G 2320/064* (2013.01); *G09G 2320/0646* (2013.01); *G09G 2340/0428* (2013.01); *G09G 2340/0457* (2013.01); *G09G 2340/06* (2013.01)

(58) Field of Classification Search

CPC combination set(s) only.
See application file for complete search history.

(56) References Cited

U.S. PATENT DOCUMENTS 6,011,878 A * 1/2000 Ushida ...................... G06T 3/40
358/3.1
6,069,610 A * 5/2000 Denda ................. G09G 3/2059
345/694

(Continued)

FOREIGN PATENT DOCUMENTS

| | | |
|---|---|---|
| CN | 1203460 C | 5/2005 |
| EP | 0 718 644 A2 | 6/1996 |

(Continued)

OTHER PUBLICATIONS

Chinese Office Action issued Dec. 29, 2016, for corresponding Chinese Patent Application No. 201510175154.9.

*Primary Examiner* — Wesner Sajous
(74) *Attorney, Agent, or Firm* — Michael Best & Friedrich LLP

(57) ABSTRACT

A display device includes a conversion section which generate a data conversion signal including a first number of bits from an input signal, an error dispersion section which generates a display control signal including a second number of bits that is smaller than the first number of bits from the data conversion signal and which spatially disperses errors that occur at the time of generating the display control signal, and a display panel section which displays an image on the basis of the display control signal.

12 Claims, 34 Drawing Sheets

(51) Int. Cl.
*H04N 9/64* (2006.01)
*H04N 9/73* (2006.01)

(56) References Cited

U.S. PATENT DOCUMENTS

| | | | | |
|---|---|---|---|---|
| 6,556,214 | B1 * | 4/2003 | Yamada | G09G 3/2022 345/589 |
| 6,646,625 | B1 | 11/2003 | Shigeta et al. | |
| 2003/0052841 | A1 * | 3/2003 | Tanaka | G09G 3/2029 345/63 |
| 2003/0193451 | A1 * | 10/2003 | Kimura | G09G 3/2022 345/60 |
| 2005/0231441 | A1 * | 10/2005 | Kim | G09G 3/2037 345/60 |
| 2008/0049239 | A1 * | 2/2008 | Chiaki | G09G 3/2051 358/1.9 |
| 2011/0176097 | A1 | 7/2011 | Shiromoto et al. | |
| 2013/0093803 | A1 | 4/2013 | Saitoh | |
| 2013/0251285 | A1 | 9/2013 | Kurokawa et al. | |

FOREIGN PATENT DOCUMENTS

| | | | |
|---|---|---|---|
| JP | 08-227012 | A | 9/1996 |
| JP | 09-203803 | A | 8/1997 |
| JP | 2008-183489 | A | 8/2008 |
| JP | 2011-145535 | A | 7/2011 |
| JP | 2013-195784 | A | 9/2013 |
| WO | WO-2012/017899 | A1 | 2/2012 |

* cited by examiner

STATE IN WHICH SMOOTH GRADATION IS DISPLAYED

STATE IN WHICH FALSE CONTOURS HAVE APPEARED AND IN WHICH IMAGE QUALITY HAS DEGRADED

NUMBER OF BITS INCLUDED IN DATA AFTER CONVERSION: 11

NUMBER OF BITS INCLUDED IN DATA AFTER CONVERSION: 12

NUMBER OF BITS INCLUDED IN DATA AFTER CONVERSION: 13

FIG. 22

Pt1 DITHER PATTERN (R)

| Data | Line | Frame N dot No. 0 | Frame N dot No. 1 | Frame N dot No. 2 | Frame N dot No. 3 | Frame N+1 dot No. 0 | Frame N+1 dot No. 1 | Frame N+1 dot No. 2 | Frame N+1 dot No. 3 | Frame N+2 dot No. 0 | Frame N+2 dot No. 1 | Frame N+2 dot No. 2 | Frame N+2 dot No. 3 | Frame N+3 dot No. 0 | Frame N+3 dot No. 1 | Frame N+3 dot No. 2 | Frame N+3 dot No. 3 |
|---|---|---|---|---|---|---|---|---|---|---|---|---|---|---|---|---|---|
| 0 | 0 | | | | | | | | | | | | | | | | |
| | 1 | | | | | | | | | | | | | | | | |
| | 2 | | | | | | | | | | | | | | | | |
| | 3 | | | | | | | | | | | | | | | | |
| 0.25 | 0 | 1 | | | | | | | 1 | | 1 | | | | | 1 | |
| | 1 | | 1 | | | | | 1 | | 1 | | | | | | | 1 |
| | 2 | | | | 1 | 1 | | | | | | 1 | | | 1 | | |
| | 3 | | | 1 | | | 1 | | | | | | 1 | 1 | | | |
| 0.5 | 0 | 1 | | 1 | | | 1 | | 1 | 1 | | 1 | | | 1 | | 1 |
| | 1 | | 1 | | 1 | 1 | | 1 | | | 1 | | 1 | 1 | | 1 | |
| | 2 | 1 | | 1 | | | 1 | | 1 | 1 | | 1 | | | 1 | | 1 |
| | 3 | | 1 | | 1 | 1 | | 1 | | | 1 | | 1 | 1 | | 1 | |
| 0.75 | 0 | | 1 | 1 | 1 | 1 | 1 | 1 | | 1 | | 1 | 1 | 1 | 1 | | 1 |
| | 1 | 1 | | 1 | 1 | 1 | 1 | | 1 | | 1 | 1 | 1 | 1 | 1 | 1 | |
| | 2 | 1 | 1 | 1 | | | 1 | 1 | 1 | 1 | 1 | | 1 | 1 | | 1 | 1 |
| | 3 | 1 | 1 | | 1 | 1 | | 1 | 1 | 1 | 1 | 1 | | | 1 | 1 | 1 |

b0 b1 b2 b3

FIG. 23

Pt2 DITHER PATTERN (G)

| Data | Line | Frame N dot No. 0 | Frame N dot No. 1 | Frame N dot No. 2 | Frame N dot No. 3 | Frame N+1 dot No. 0 | Frame N+1 dot No. 1 | Frame N+1 dot No. 2 | Frame N+1 dot No. 3 | Frame N+2 dot No. 0 | Frame N+2 dot No. 1 | Frame N+2 dot No. 2 | Frame N+2 dot No. 3 | Frame N+3 dot No. 0 | Frame N+3 dot No. 1 | Frame N+3 dot No. 2 | Frame N+3 dot No. 3 |
|---|---|---|---|---|---|---|---|---|---|---|---|---|---|---|---|---|---|
| 0 | 0 | | | | | | | | | | | | | | | | |
| | 1 | | | | | | | | | | | | | | | | |
| | 2 | | | | | | | | | | | | | | | | |
| | 3 | | | | | | | | | | | | | | | | |
| 0.25 | 0 | | | 1 | | 1 | | | | | | | 1 | | 1 | | |
| | 1 | | | | 1 | | 1 | | | | | 1 | | 1 | | | |
| | 2 | | 1 | | | | | | 1 | 1 | | | | | | 1 | |
| | 3 | 1 | | | | | | 1 | | | 1 | | | | | | 1 |
| 0.5 | 0 | | 1 | | 1 | 1 | | 1 | | | 1 | | 1 | 1 | | 1 | |
| | 1 | 1 | | 1 | | | 1 | | 1 | 1 | | 1 | | | 1 | | 1 |
| | 2 | | 1 | | 1 | 1 | | 1 | | | 1 | | 1 | 1 | | 1 | |
| | 3 | 1 | | 1 | | | 1 | | 1 | 1 | | 1 | | | 1 | | 1 |
| 0.75 | 0 | 1 | 1 | | 1 | | 1 | 1 | 1 | 1 | 1 | 1 | | 1 | | 1 | 1 |
| | 1 | 1 | 1 | 1 | | 1 | | 1 | 1 | 1 | 1 | | 1 | | 1 | 1 | 1 |
| | 2 | 1 | | 1 | 1 | 1 | 1 | 1 | | | 1 | 1 | 1 | 1 | 1 | | 1 |
| | 3 | | 1 | 1 | 1 | 1 | 1 | | 1 | 1 | | 1 | 1 | 1 | 1 | 1 | |

b0 b1 b2 b3

FIG. 24

Pt3 DITHER PATTERN (B)

| Data | Line | Frame N dot No. 0 | Frame N dot No. 1 | Frame N dot No. 2 | Frame N dot No. 3 | Frame N+1 dot No. 0 | Frame N+1 dot No. 1 | Frame N+1 dot No. 2 | Frame N+1 dot No. 3 | Frame N+2 dot No. 0 | Frame N+2 dot No. 1 | Frame N+2 dot No. 2 | Frame N+2 dot No. 3 | Frame N+3 dot No. 0 | Frame N+3 dot No. 1 | Frame N+3 dot No. 2 | Frame N+3 dot No. 3 |
|---|---|---|---|---|---|---|---|---|---|---|---|---|---|---|---|---|---|
| 0 | 0 | | | | | | | | | | | | | | | | |
| | 1 | | | | | | | | | | | | | | | | |
| | 2 | | | | | | | | | | | | | | | | |
| | 3 | | | | | | | | | | | | | | | | |
| 0.25 | 0 | | 1 | | | | | 1 | | 1 | | | | | | | 1 |
| | 1 | 1 | | | | | | | 1 | | 1 | | | | | 1 | |
| | 2 | | | 1 | | | 1 | | | | | | 1 | 1 | | | |
| | 3 | | | | 1 | 1 | | | | | | 1 | | | 1 | | |
| 0.5 | 0 | 1 | | 1 | | | 1 | | 1 | 1 | | 1 | | | 1 | | 1 |
| | 1 | | 1 | | 1 | 1 | | 1 | | | 1 | | 1 | 1 | | 1 | |
| | 2 | 1 | | 1 | | | 1 | | 1 | 1 | | 1 | | | 1 | | 1 |
| | 3 | | 1 | | 1 | 1 | | 1 | | | 1 | | 1 | 1 | | 1 | |
| 0.75 | 0 | 1 | | 1 | 1 | 1 | 1 | | 1 | | 1 | 1 | 1 | 1 | 1 | 1 | |
| | 1 | | 1 | 1 | 1 | 1 | 1 | 1 | | 1 | | 1 | 1 | 1 | 1 | | 1 |
| | 2 | 1 | 1 | | 1 | 1 | | 1 | 1 | 1 | 1 | 1 | | | 1 | 1 | 1 |
| | 3 | 1 | 1 | 1 | | | 1 | 1 | 1 | 1 | 1 | | 1 | 1 | | 1 | 1 |

b0 b1 b2 b3

FIG. 25

Pt4 DITHER PATTERN (W)

| Data | Line | Frame N | | | | Frame N+1 | | | | Frame N+2 | | | | Frame N+3 | | | |
|---|---|---|---|---|---|---|---|---|---|---|---|---|---|---|---|---|---|
| | | dot No. | | | | dot No. | | | | dot No. | | | | dot No. | | | |
| | | 0 | 1 | 2 | 3 | 0 | 1 | 2 | 3 | 0 | 1 | 2 | 3 | 0 | 1 | 2 | 3 |
| 0 | 0 | | | | | | | | | | | | | | | | |
| | 1 | | | | | | | | | | | | | | | | |
| | 2 | | | | | | | | | | | | | | | | |
| | 3 | | | | | | | | | | | | | | | | |
| 0.25 | 0 | | | | 1 | | 1 | | | | | 1 | | 1 | | | |
| | 1 | | | 1 | | 1 | | | | | | | 1 | | 1 | | |
| | 2 | 1 | | | | | | 1 | | | 1 | | | | | | 1 |
| | 3 | | 1 | | | | | | 1 | 1 | | | | | | 1 | |
| 0.5 | 0 | 1 | | 1 | | | 1 | | 1 | 1 | | 1 | | | 1 | | 1 |
| | 1 | | 1 | | 1 | 1 | | 1 | | | 1 | | 1 | 1 | | 1 | |
| | 2 | 1 | | 1 | | | 1 | | 1 | 1 | | 1 | | | 1 | | 1 |
| | 3 | | 1 | | 1 | 1 | | 1 | | | 1 | | 1 | 1 | | 1 | |
| 0.75 | 0 | 1 | 1 | 1 | | 1 | | 1 | 1 | 1 | 1 | | 1 | | 1 | 1 | 1 |
| | 1 | 1 | 1 | | 1 | | 1 | 1 | 1 | 1 | 1 | 1 | | 1 | | 1 | 1 |
| | 2 | | 1 | 1 | 1 | 1 | 1 | | 1 | 1 | | 1 | 1 | 1 | 1 | 1 | |
| | 3 | 1 | | 1 | 1 | 1 | 1 | 1 | | | 1 | 1 | 1 | 1 | 1 | | 1 |

b0 b1 b2 b3

FIG. 29

| Data | Line | Frame N | | | | Frame N+1 | | | | Frame N+2 | | | | Frame N+3 | | | |
|---|---|---|---|---|---|---|---|---|---|---|---|---|---|---|---|---|---|
| | | dot No. | | | | dot No. | | | | dot No. | | | | dot No. | | | |
| | | 0 | 1 | 2 | 3 | 0 | 1 | 2 | 3 | 0 | 1 | 2 | 3 | 0 | 1 | 2 | 3 |
| 0.25 | 0 | + | + | + | + | − | − | − | − | + | + | + | + | − | − | − | − |
| | 1 | − | − | − | − | + | + | + | + | − | − | − | − | + | + | + | + |
| | 2 | + | + | + | + | − | − | − | − | + | + | + | + | − | − | − | − |
| | 3 | − | − | − | − | + | + | + | + | − | − | − | − | + | + | + | + |

b0 b1 b2 b3

DISPLAY DEVICE AND DISPLAY CONTROL METHOD

CROSS-REFERENCE TO RELATED APPLICATION

This application is based upon and claims the benefit of priority of the prior Japanese Patent Application No. 2014-084048, filed on Apr. 15, 2014, the entire contents of which are incorporated herein by reference.

FIELD

The embodiments discussed herein are related to a display device and a display control method.

BACKGROUND

In recent years, display devices in which the RGBW system is adopted have been developed. Display devices with the RGBW system have pixels which are each made up of a red (R) subpixel, green (G) subpixel, blue (B) subpixel, and a white (W) subpixel. Luminance is improved by the W subpixel, so the luminance of a backlight which lights a liquid crystal panel from behind can be reduced, for example. The reduction of the luminance of a backlight reduces the power consumption of an entire display device.

With the above display device, however, image quality may degrade especially on a gradation screen or the like. Accordingly, the following technique is proposed in order to prevent image quality degradation, for example. A random number sequence is convoluted into a luminance variable to generate a random number, convoluted luminance variable. This random number convoluted luminance variable is convoluted into an image signal to generate a random number convoluted image signal.

See, for example, Japanese Laid-open Patent Publication No. 2013-195784.

SUMMARY

There are provided a display device and a display control method which improve image quality. Alternatively, there are provided a display device and a display control method which improve visibility.

According to an aspect, there is provided a display device including a conversion section which generates a data conversion signal including a first number of bits from an input signal, an error dispersion section which generates a display control signal having a second number of bits that is smaller than the first number of bits from the data conversion signal and which spatially disperses errors that occur at the time of generating the display control signal, and a display panel section which displays an image on the basis of the display control signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 22 illustrates a dither pattern;

FIG. 23 illustrates a dither pattern;

FIG. 24 illustrates a dither pattern;

FIG. 25 illustrates a dither pattern;

FIG. 29 is a view for describing uneven distribution of DC components;

DESCRIPTION OF EMBODIMENTS

Figure 1:
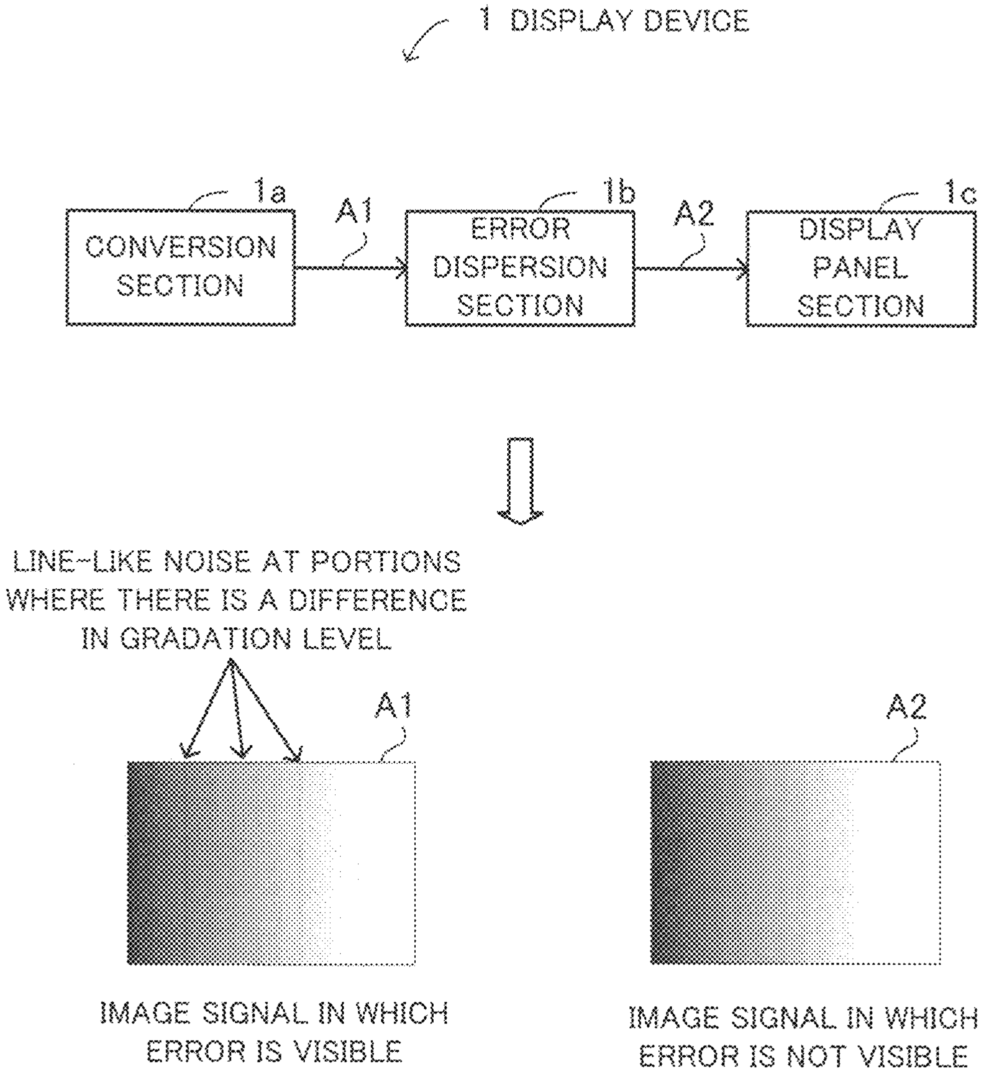
FIG. 1 illustrates an example of the structure of a display device.

Embodiments will now be described with reference to the accompanying drawings.

Disclosed embodiments are simple examples. It is a matter of course that a proper change which suits the spirit of the invention and which will readily occur to those skilled in the art falls within the scope of the present invention. Furthermore, in order to make description clearer, the width, thickness, shape, or the like of each component may schematically be illustrated in the drawings compared with the real state. However, it is a simple example and the interpretation of the present invention is not restricted.

In addition, in the present invention and the drawings the same components that have already been described in previous drawings are marked with the same numerals and detailed descriptions of them may be omitted according to circumstances.

First Embodiment

FIG. 1 illustrates an example of the structure of a display device. A display device 1 according to a first embodiment includes a conversion section 1*a*, an error dispersion section 1*b*, and a display panel section 1*c*.

The conversion section 1*a* converts an input signal to a data conversion signal having a first number of bits. The generated data conversion signal includes an image signal A1 in which an error (line-like noise which appears at portions where there is a difference in gradation level) is visible, for example. The conversion section 1*a* is applicable not only to a display device adopting the RGBW system but also to a display device which adopts techniques other than the RGBW system for controlling and reducing the luminance of a backlight by performing a gradation conversion process on an image signal. For example, a content adaptive backlight control (CABC) technique is one of such techniques for reducing power consumption. With the CABC technique the ratio of the luminance of a backlight to the maximum luminance and gradation distribution setting of a display image are controlled according to the characteristic (gradation distribution) of the display image. The conversion section 1*a* is also applicable to the CABC technique.

The error dispersion section 1*b* generates a display control signal having a second number of bits which is smaller than the first number of bits a data conversion signal has, and spatially disperses errors which occur at the time of generating the display control signal. The generated display control signal is, for example, an image signal A2 in which an error is not visible. The display panel section 1*c* displays an image on the basis of a display control signal. The error dispersion section 1*b* has the function of dispersing (diffusing) errors which occur at the time of reducing the number of bits.

As has been described, the display device 1 converts an image signal to a data conversion signal, spatially disperses errors which occur at the time of generating a display control signal, and displays an image by the use of the display control signal having bits the number of which is smaller than that of bits the data conversion signal has.

By doing so, image quality degradation caused by errors at portions where there is a difference in gradation level is prevented and visibility is improved. In the following description, linear noise which appears at portions where there is a difference in gradation level is also referred to as a false contour.

Problems to be solved will now be described by the use of FIGS. 2 through 9 before a detailed description of embodiments will be given. In FIGS. 2 through 7, a factor in the appearance of a false contour is described. In FIG. 8, a portion where a false contour appears is described. Furthermore, in FIG. 9, the phenomenon of the movement of a false contour is described.

Figure 2:
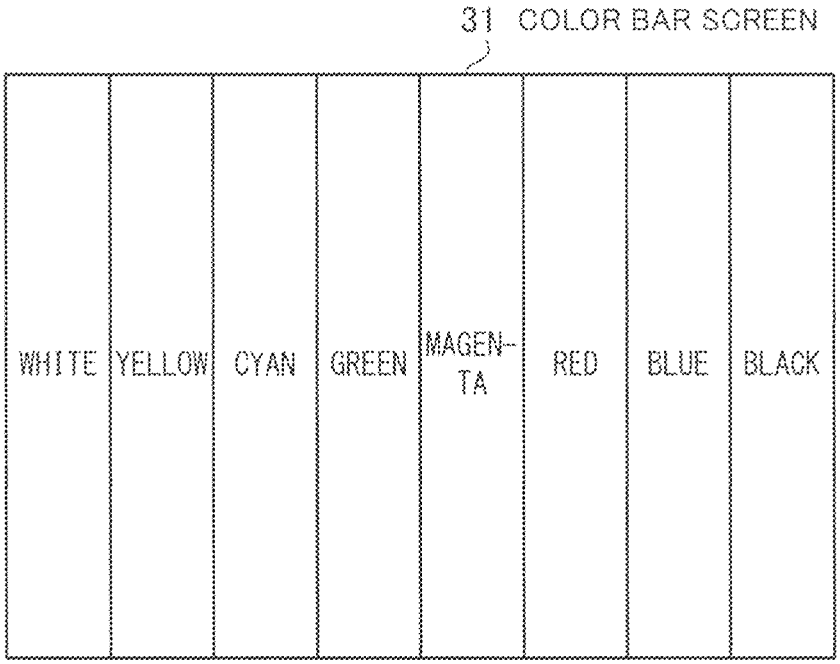
FIG. 2 illustrates an example of a display screen.
Figure 3:
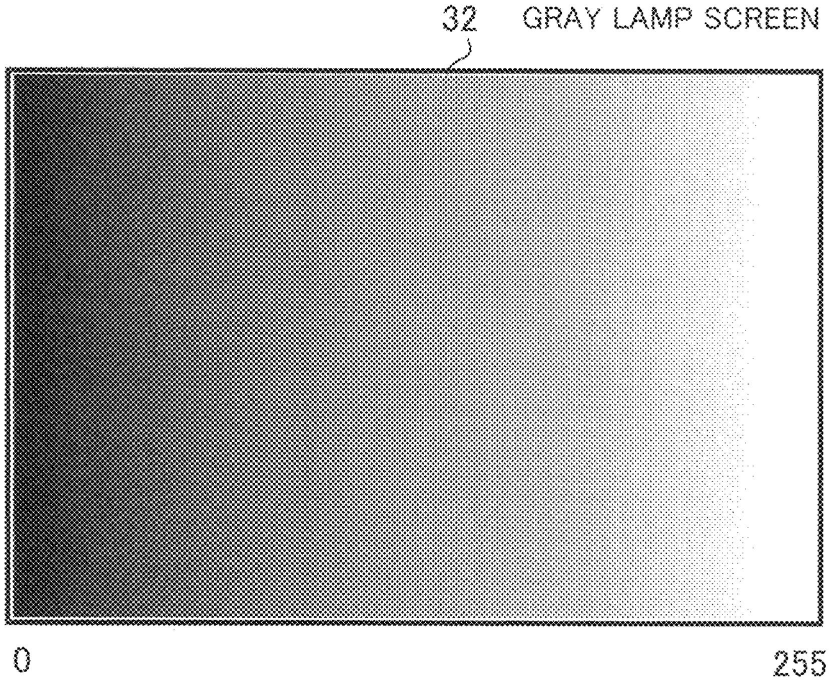
FIG. 3 illustrates an example of a display screen.

Each of FIGS. 2 and 3 illustrates an example of a display screen. FIGS. 2 and 3 illustrate a color bar screen 31 and a gray lamp screen 32, respectively, as display screens.

A white bar, a yellow bar, a cyan bar, a green bar, a magenta bar, a red bar, a blue bar, and a black bar each having the same width are arranged in that order from left to right on the color bar screen 31. If gradation is represented by 8 bits, then a gradation image is displayed by 256 gradation levels from 0 to 255 on the gray lamp screen 32, for example.

In a display device, the luminance of a backlight is changed according to a displayed image. The luminance of the backlight is controlled by a pulse width modulated (PWM) signal. The amount of power supplied to the backlight is determined by a pulse duty ratio of the PWM signal. The backlight is an example of a light source unit and another light source unit, such as a frontlight which is arranged in front of an image display panel, may be used.

When the color bar screen 31 is displayed, a value based on a duty ratio of a PWM signal (hereinafter referred to as a PWM value) supplied to the backlight is set to a maximum value in order to control the luminance of the backlight. In this case, maximum power is supplied to the backlight.

Furthermore, when the gray lamp screen 32 is displayed, a PWM value of the backlight is set to a minimum value in order to control the luminance of the backlight. In this case, minimum power is supplied to the backlight.

Figure 4:
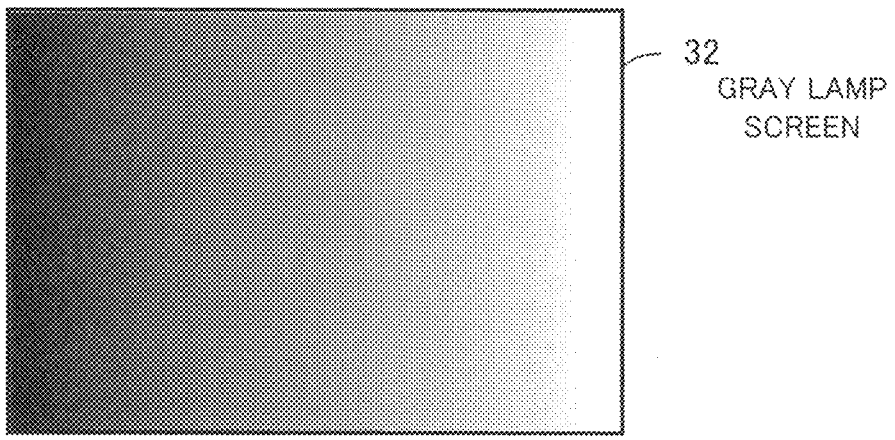
FIG. 4 illustrates a screen on which a false contour has not appeared yet and a screen on which a false contour has appeared.
Figure 4:
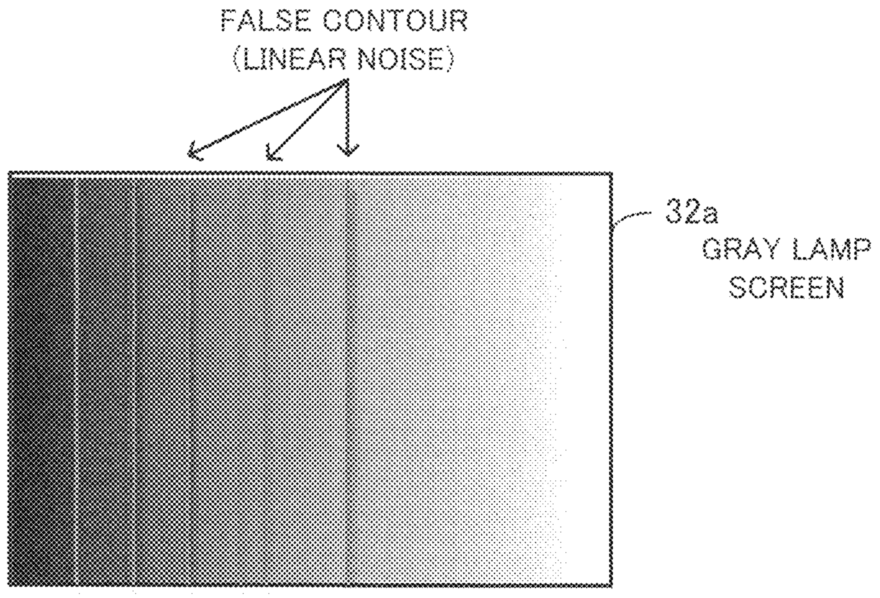

FIG. 4 illustrates a screen on which a false contour has not appeared yet and a screen on which a false contour has appeared. Usually smooth gradation is displayed on a gray lamp screen 32. On the other hand, false contours (linear noise) have appeared at portions where there is a difference in gradation level on a gray lamp screen 32*a*.

Figure 5:
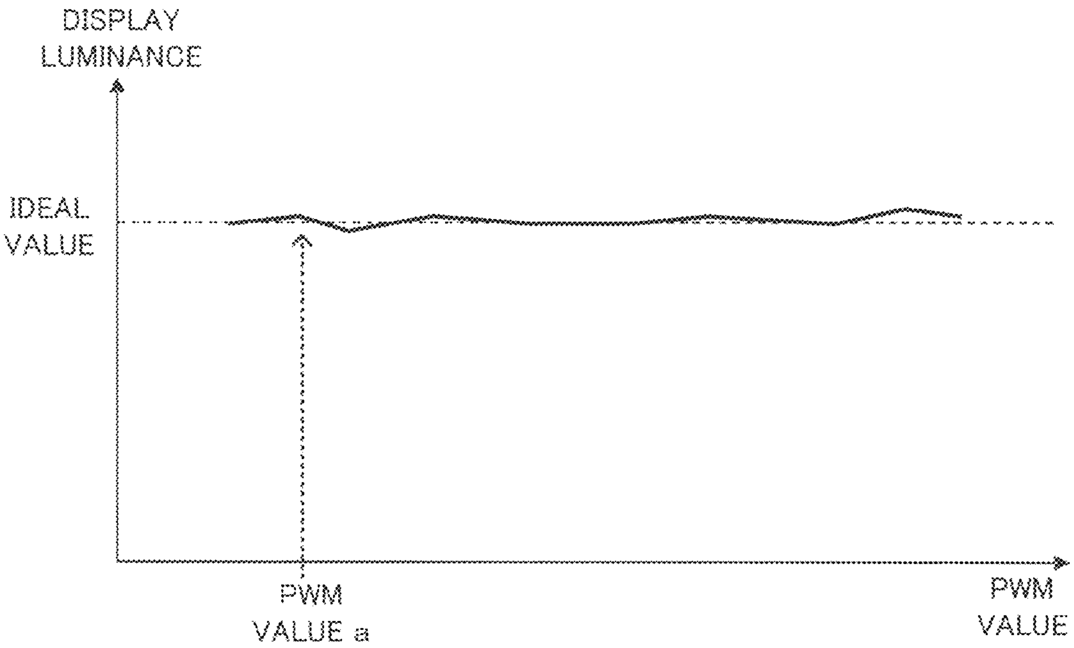
FIG. 5 is a view for describing a factor in the appearance of a false contour.

FIG. 5 is a view for describing a factor in the appearance of a false contour. In FIG. 5, a horizontal axis indicates a PWM value and a vertical axis indicates display luminance. The display luminance is not the luminance of a backlight but the luminance of a display panel which a user finally views.

It is desirable that, ideally, display luminance be constant regardless of a PWM value (regardless of the luminance of a backlight).

That is to say, it is desirable that brightness which a user views for an image signal be controlled so that it will not depend on the luminance of a backlight.

In FIGS. 2 and 3, for example, display luminance values for the leftmost white bar region on the color bar screen 31 and a white region on the gray lamp screen 32 corresponding to the gradation level 255 are the same.

That is to say, it is assumed that when a PWM value of the backlight is the maximum value, display luminance for the white bar region on the color bar screen 31 is 500 candelas. Even if the gray lamp screen 32 is displayed with a PWM value of the backlight set to the minimum value, display luminance for the white region on the gray lamp screen 32 is 500 candelas.

In reality, however, display luminance changes according to a PWM value. As can be seen from FIG. 5, for example, display luminance corresponding to the PWM value deviates from an ideal value.

Furthermore, as can be seen from FIG. 5, the amount of a deviation between display luminance corresponding to a PWM value and the ideal value varies depending on the PWM value.

Figure 6:
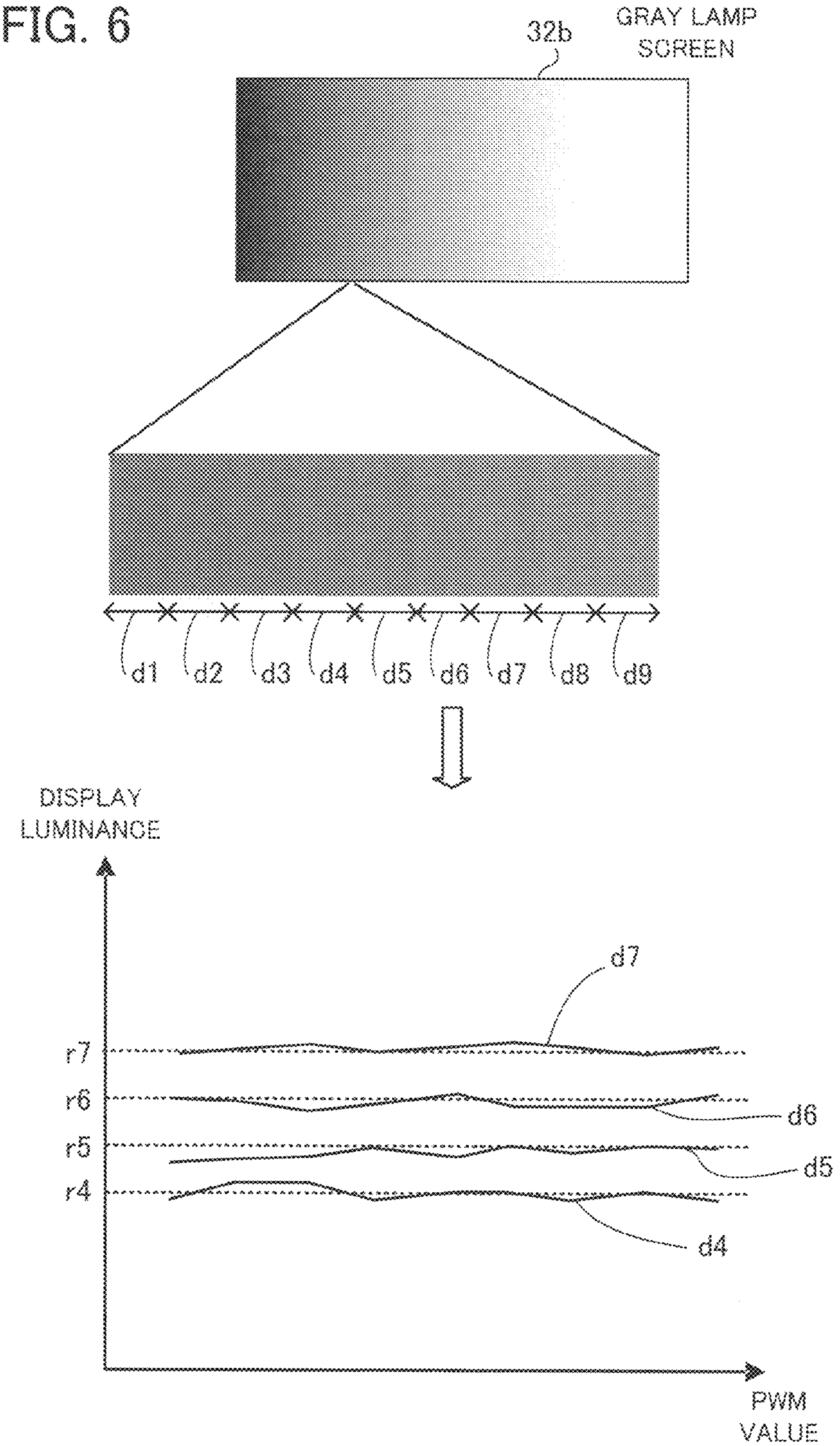
FIG. 6 is a view for describing a factor in the appearance of a false contour.

FIG. 6 is a view for describing a factor in the appearance of a false contour. FIG. 6 illustrates a state in which the value of display luminance corresponding to a PWM value also fluctuates on each of partial gradation images.

It is assumed that partial gradation images included in a region on a gray lamp screen 32*b* are partial gradation images d1 through d9. Furthermore, it is assumed that ideal values of display luminance for the partial gradation images d4 through d7 are ideal values r4 through r7 respectively.

In this case, as illustrated in FIG. 6, display luminance fluctuates according to a PWM value and deviates from the ideal values r4 through r7, on the partial gradation images d4 through d7 respectively. In addition, the amounts of deviations from the ideal values r4 through r7 depend on a PWM value.

Figure 7:
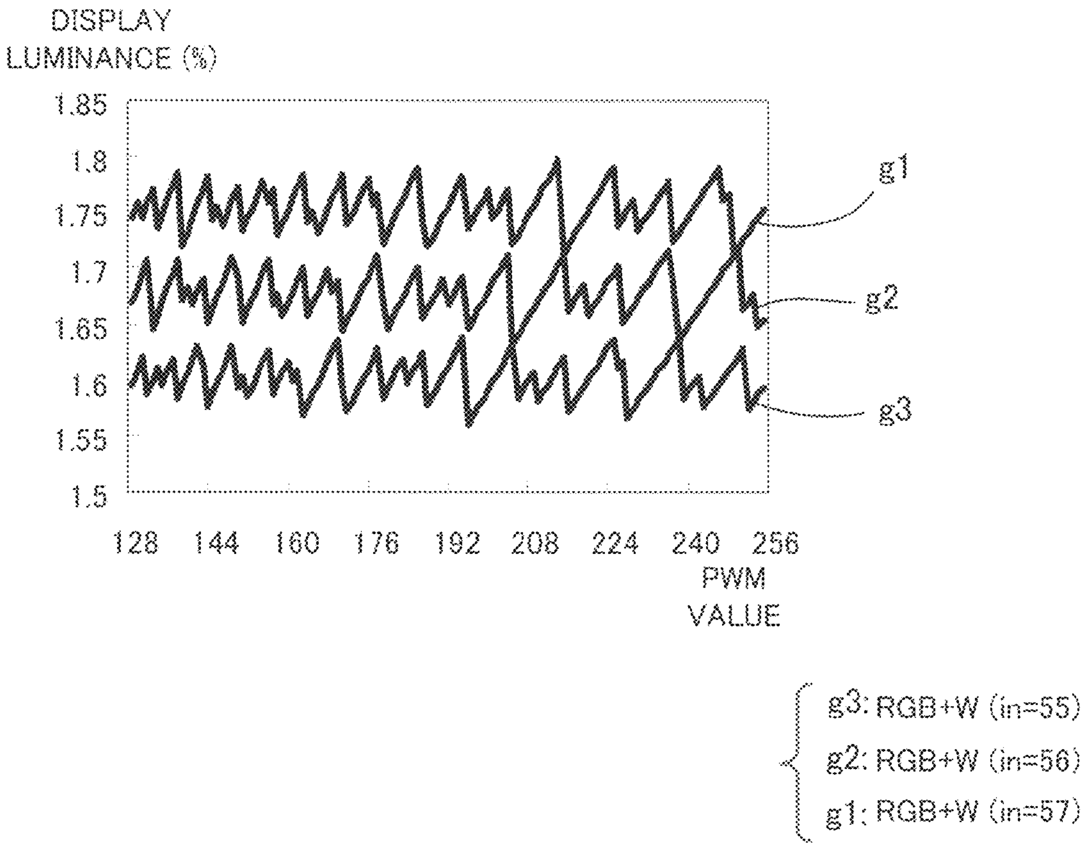
FIG. 7 illustrates measurement results of the relationship between display luminance and a PWM value.
Figure 8:
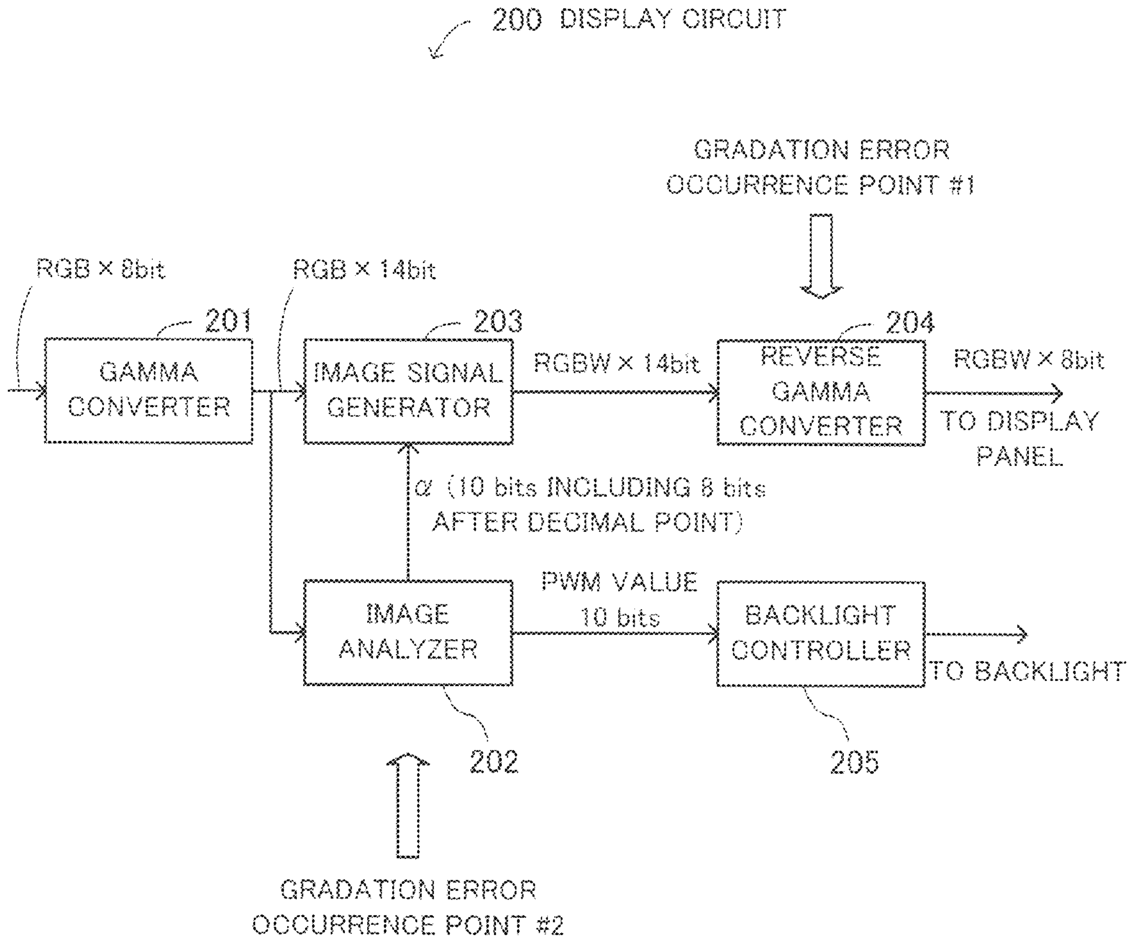
FIG. 8 illustrates a point in a display circuit at which a gradation error occurs.

FIG. 7 illustrates measurement results of the relationship between display luminance and a PWM value. In FIG. 7, a horizontal axis indicates a PWM value and a vertical axis indicates normalized display luminance (%). Graph g1 through g3 indicate measurement results obtained at the gradation levels 55, 56, and 57 respectively.

As can be seen from the measurement results of FIG. 7, display luminance fluctuates according to a PWM value and deviates from ideal values, at the gradation levels 55, 56, and 57. In addition, as can be seen from the measurement results of FIG. 7, the amounts of deviations from the ideal values depend on a PWM value.

As has been described in FIGS. 5 through 7, the value of display luminance corresponding to a PWM value deviates from an ideal value at each gradation level. This is a factor in the appearance of a false contour. Furthermore, data conversion errors (hereinafter referred to as gradation errors) occur in digital data conversion calculations and differ among different gradation levels. Such a gradation error causes a deviation at each gradation level between display luminance corresponding to a PWM value and an ideal value.

FIG. 8 illustrates a point in a display circuit at which a gradation error occurs. A display circuit 200 includes a gamma (γ) converter 201, an image analyzer 202, an image signal generator 203, a reverse gamma (1/γ) converter 204, and a backlight controller 205 as a display control system.

The gamma converter 201 gamma-converts an input RGB signal including an 8-bit R signal value, an 8-bit G signal value, and an 8-bit B signal value, and outputs an RGB signal including a 14-bit R signal value, a 14-bit G signal value, and a 14-bit B signal value. When the image analyzer 202 receives the RGB signal outputted from the gamma converter 201, the image analyzer 202 calculates an expansion coefficient α (which has 10 bits including 8 bits after the decimal point, for example) and generates a PWM value (which has 10 bits, for example).

The image signal generator 203 generates a W signal on the basis of the expansion coefficient α and outputs an RGBW signal including a 14-bit R signal value, a 14-bit G signal value, a 14-bit B signal value, and a 14-bit W signal value.

The reverse gamma converter 204 performs reverse gamma conversion on the RGBW signal outputted from the 0.10 image signal generator 203, generates an RGBW signal including an 8-bit R signal value, an 8-bit G signal value, an 8-bit B signal value, and an 8-bit W signal value, and outputs the RGBW signal to an image display panel. Furthermore, the backlight controller 205 controls the luminance of a backlight on the basis of the PWM value outputted from the image analyzer 202.

The whole of the gamma converter 201, the image signal generator 203, and the reverse gamma converter 204, of the above components, may be considered as the conversion section 1*a* or each of the gamma converter 201, the image signal generator 203, and the reverse gamma converter 204 may be considered as the conversion section 1*a*. In addition, each of the image analyzer 202 and the reverse gamma converter 204, of the above components, performs a data conversion process in order to receive an input signal including bits and output a signal including bits the number of which is smaller than that of the bits included in the input signal. A display panel is an example of the display panel section 1*c*.

The reverse gamma converter 204 makes a data conversion to convert data including a 14-bit R signal value, a 14-bit G signal value, a 14-bit B signal value, and a 14-bit W signal value to data including an 8-bit R signal value, an 8-bit G signal value, an 8-bit B signal value, and an 8-bit W signal value. Furthermore, the image analyzer 202 makes a data conversion to convert an expansion coefficient which has N bits (N>10) to the expansion coefficient α which has 10 bits.

Accordingly, there are a gradation error occurrence point #1 at which a gradation error occurs due to the operation of the reverse gamma converter 204 and a gradation error occurrence point #2 at which a gradation error occurs due to the operation of the image analyzer 202 in the display circuit 200.

The phenomenon of the movement of a false contour (hereinafter referred to as a waving phenomenon) will now be described. It is assumed that the luminance of a backlight is changed by changing a PWM value. That is to say, it is assumed that dimming control is exercised.

As stated above, the amount of a deviation between display luminance and an ideal value depends on a PWM value. As a result, when dimming control is exercised, the position of a false contour may shift with a gradual change in the luminance of the backlight. That is to say, a waving phenomenon may occur.

Figure 9:
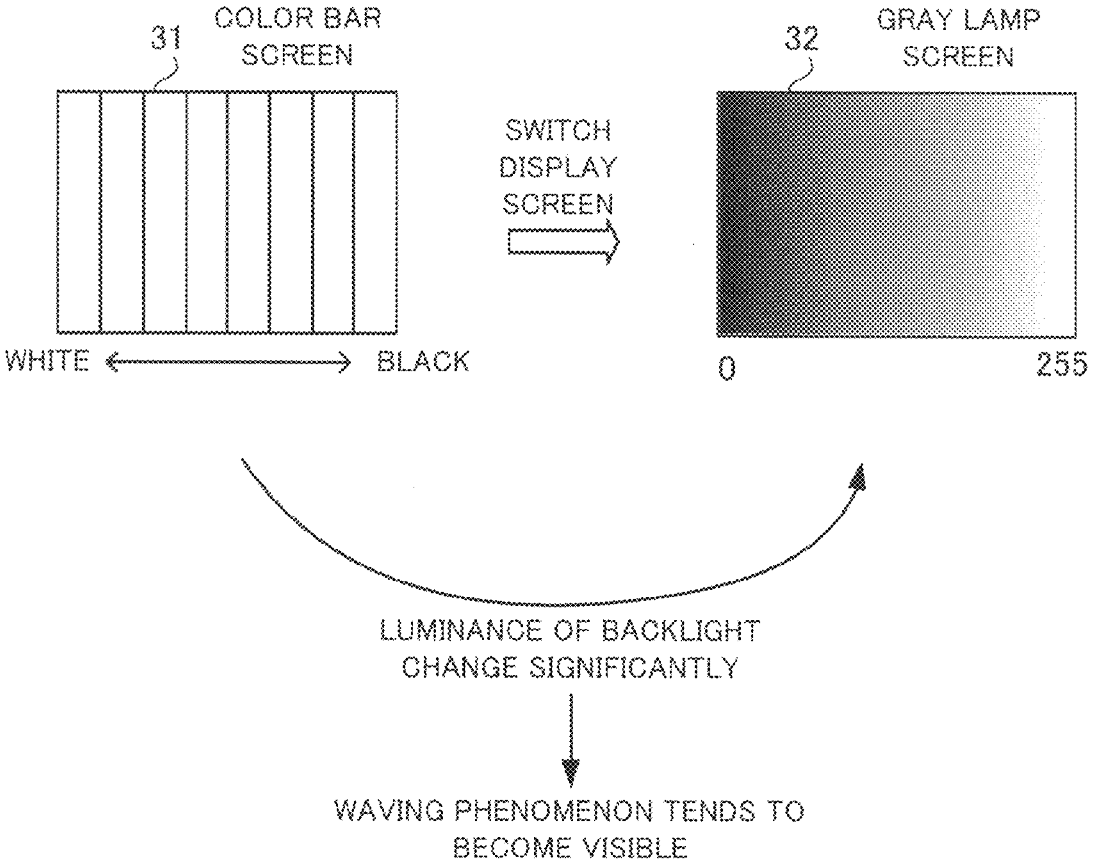
FIG. 9 illustrates switching of a display screen.

FIG. 9 illustrates switching of a display screen. If a display screen is switched from a color bar screen 31 to a gray lamp screen 32, the luminance of a backlight changes significantly. A waving phenomenon tends to occur especially at screen switching time.

Embodiments are given with the above problems taken into consideration. Image display control is exercised to reduce a gradation error, to prevent the appearance of a false contour or the occurrence of a waving phenomenon, and to improve image quality or visibility.

Display devices according to embodiments will now be described in detail. With display devices according to second and third embodiments described below, a measure to reduce a gradation error which occurs at the gradation error occurrence point #1 illustrated in FIG. 8 is taken. Furthermore, with a display device according to a fourth embodiment a measure to reduce gradation errors which occur not only at the gradation error occurrence point #1 illustrated in FIG. 8 but also at the gradation error occurrence point #2 illustrated in FIG. 8 is taken.

Second Embodiment

Figure 10:
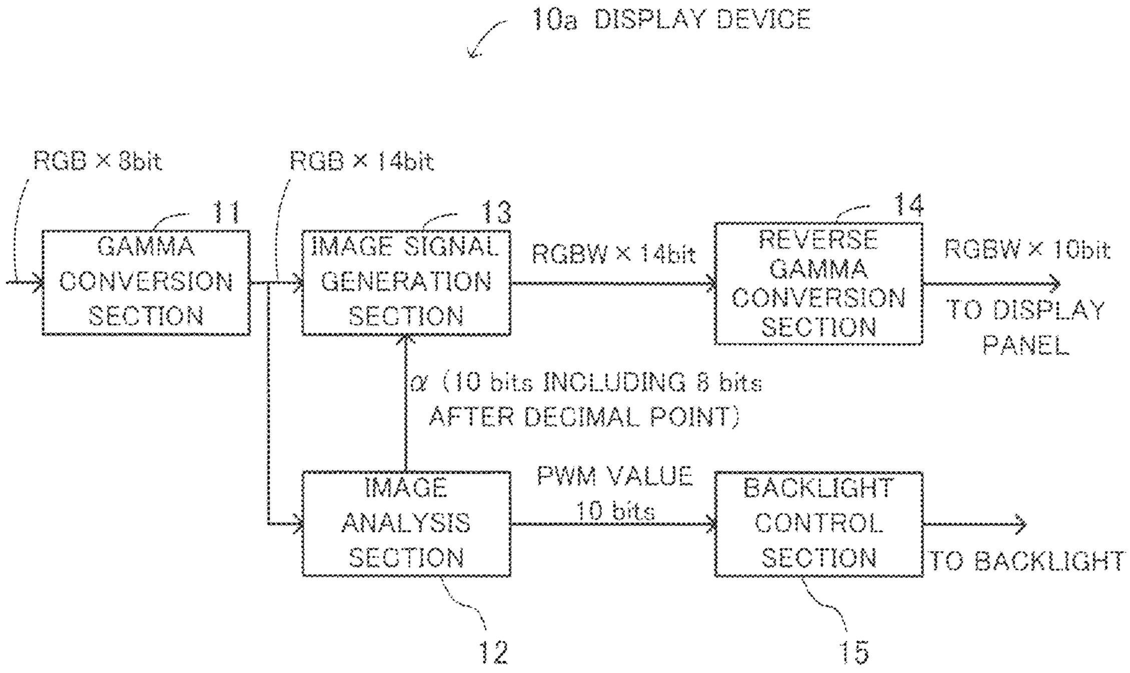
FIG. 10 illustrates an example of the structure of a display device.

FIG. 10 illustrates an example of the structure of a display device. A display device 10*a* includes a gamma (γ) conversion section 11, an image analysis section 12, an image signal generation section 13, a reverse gamma (1/γ) conversion section 14, and a backlight control section 15 as a display control system. The reverse gamma conversion section 14 includes the function of the conversion section 1*a* illustrated in FIG. 1.

The gamma conversion section 11 gamma-converts an input RGB signal including an 8-bit R (first subpixel) signal value, an 8-bit G (second subpixel) signal value, and an 8-bit B (third subpixel) signal value, and outputs an RGB signal including a 14-bit R signal value, a 14-bit G signal value, and a 14-bit B signal value.

When the image analysis section 12 receives the RGB signal outputted from the gamma conversion section 11, the image analysis section 12 calculates the expansion coefficient α (which has 10 bits including 8 bits after the decimal point, for example) and generates a PWM value (which has 10 bits, for example).

The image signal generation section 13 generates a W (fourth subpixel) signal on the basis of the expansion coefficient α and outputs an RGBW signal including a 14-bit R signal value, a 14-bit G signal value, a 14-bit B signal value, and a 14-bit W signal value.

The reverse gamma conversion section 14 performs reverse gamma conversion on the RGBW signal outputted from the image signal generation section 13, generates an RGBW signal including a 10-bit R signal value, a 10-bit G signal value, a 10-bit B signal value, and a 10-bit W signal value, and outputs the RGBW signal to a display side (display panel section side). Furthermore, the backlight control section 15 controls the luminance of a backlight on the basis of the PWM value outputted from the image analysis section 12.

The reverse gamma converter 204 illustrated in FIG. 8 converts data including a 14-bit R signal value, a 14-bit G signal value, a 14-bit B signal value, and a 14-bit W signal value to data including an 8-bit R signal value, an 8-bit G signal value, an 8-bit B signal value, and an 8-bit W signal value. On the other hand, the reverse gamma conversion section 14 illustrated in FIG. 10 converts data including a 14-bit R signal value, a 14-bit G signal value, a 14-bit B signal value, and a 14-bit W signal value to data including a 10(>8)-bit R signal value, a 10(>8)-bit G signal value, a 10(>8)-bit B signal value, and a 10(>8)-bit W signal value.

Figure 11:
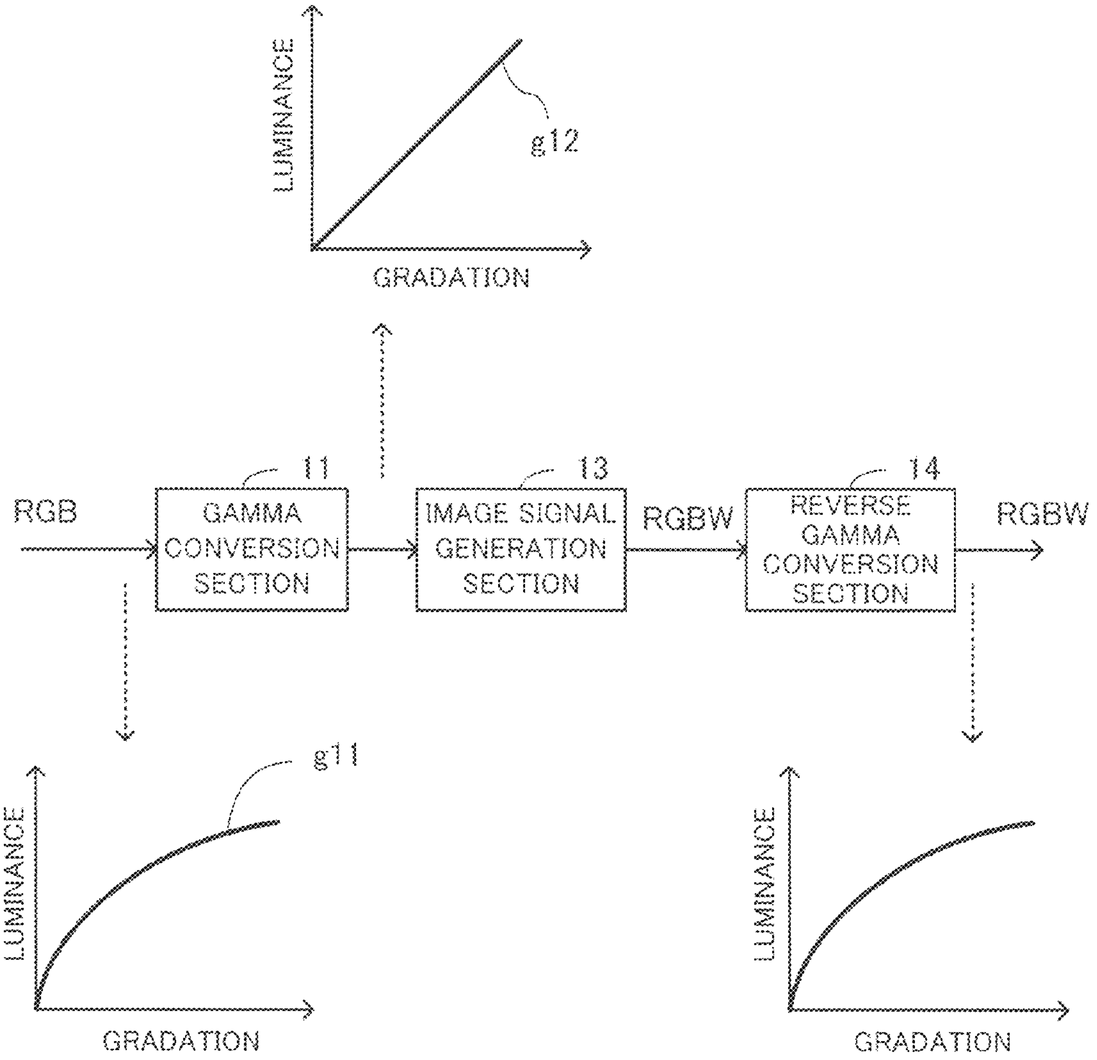
FIG. 11 is a view for describing gamma conversion and reverse gamma conversion.

Gamma conversion and reverse gamma conversion will now be described. FIG. 11 is a view for describing gamma conversion and reverse gamma conversion. In FIG. 11, a horizontal axis indicates gradation and a vertical axis indicates luminance.

In the display device 10*a*, each pixel includes a W subpixel. For example, it is assumed that setting is performed to double the luminance of W subpixels. In this case, control is exercised in order to keep display luminance at a value before doubling the luminance of W subpixels. For example, the luminance of the backlight is halved.

However, if the luminance of only W subpixels is increased, portions in which brightness increases by W subpixels and portions in which brightness does not increase because of a small W signal value mingle on one screen. Accordingly, control is exercised so as to increase the luminance of R subpixels, G subpixels, B subpixels, and W subpixels and reduce the luminance of the backlight whose power consumption is high.

On the other hand, doubling the luminance of an input RGB signal before the generation of a W signal value is not realized only by doubling a gradation value. The reason for this is that, as illustrated in FIG. 11, the gradation-luminance characteristic of an RGB signal inputted to the gamma conversion section 11 is indicated by a graph g11, that is to say, by a curve and not by a straight line (gradation-luminance characteristic of an RGB signal inputted to the gamma conversion section 11 is not linear).

Accordingly, the gamma conversion section 11 converts the gradation-luminance characteristic of an RGB signal indicated by the graph g11 to obtain a linear gradation-luminance characteristic indicated by a graph g12. With the linear gradation-luminance characteristic indicated by the graph g12, gradation is linearly associated with luminance, so luminance is changed in proportion to a gradation value by a simple calculation.

On the other hand, the reverse gamma conversion section 14 performs a reverse conversion process on the graph g12 to obtain a gradation-luminance characteristic which is the same as the gradation-luminance characteristic of the original RGB signal, and outputs an RGBW signal including a W signal value generated by the image signal generation section 13.

A reduction in gradation errors by the display device 10*a* will now be described by making a comparison between the input-output characteristic of the reverse gamma converter 204 illustrated in FIG. 8 and the input-output characteristic of the reverse gamma conversion section 14 illustrated in FIG. 10.

Figure 12:
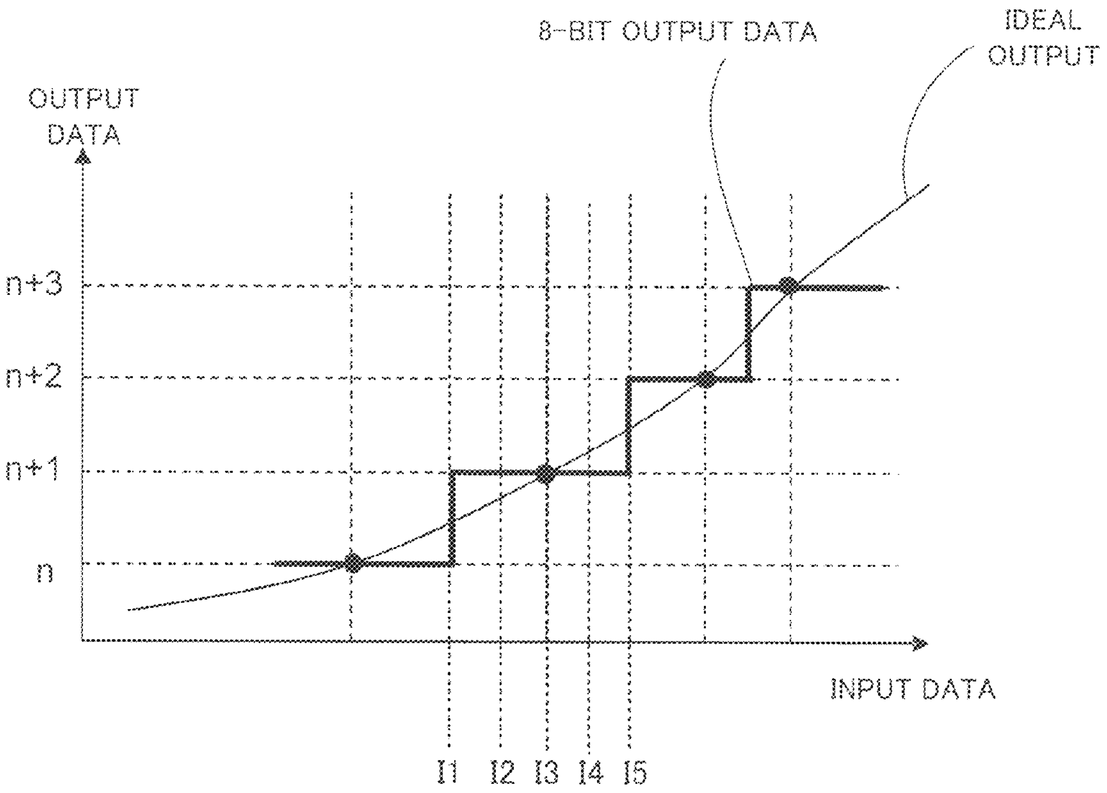
FIG. 12 illustrates the input-output characteristic of a reverse gamma converter.

FIG. 12 illustrates the input-output characteristic of a reverse gamma converter. FIG. 12 illustrates the input-output characteristic of the reverse gamma converter 204 illustrated in FIG. 8. In FIG. 12, a horizontal axis indicates data inputted to the reverse gamma converter 204 (data outputted from the image signal generator 203 illustrated in FIG. 8) and a vertical axis indicates data outputted from the reverse gamma converter 204 (data after conversion).

The reverse gamma converter 204 converts 14-bit input data and outputs 8-bit data. With this data conversion, for example, all input data values I1 through are converted to output data values (n+1) and are outputted.

Figure 13:
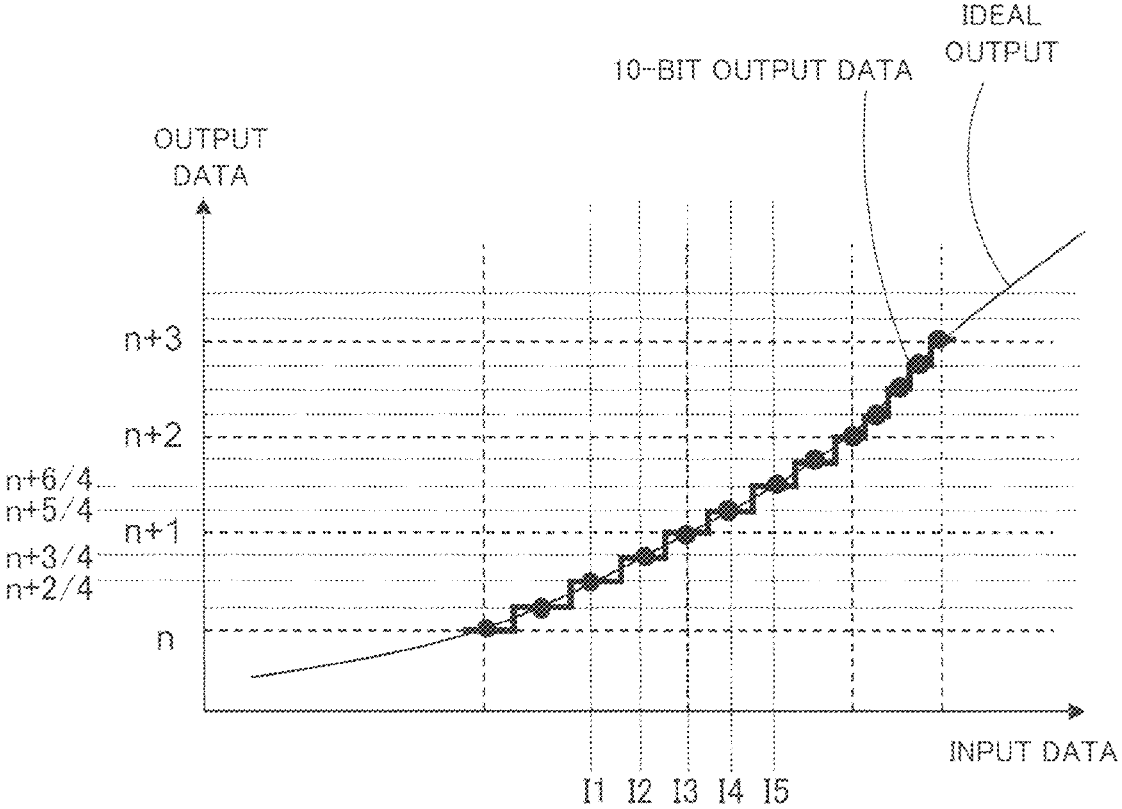
FIG. 13 illustrates the input-output characteristic of a reverse gamma conversion section.
Figure 14:
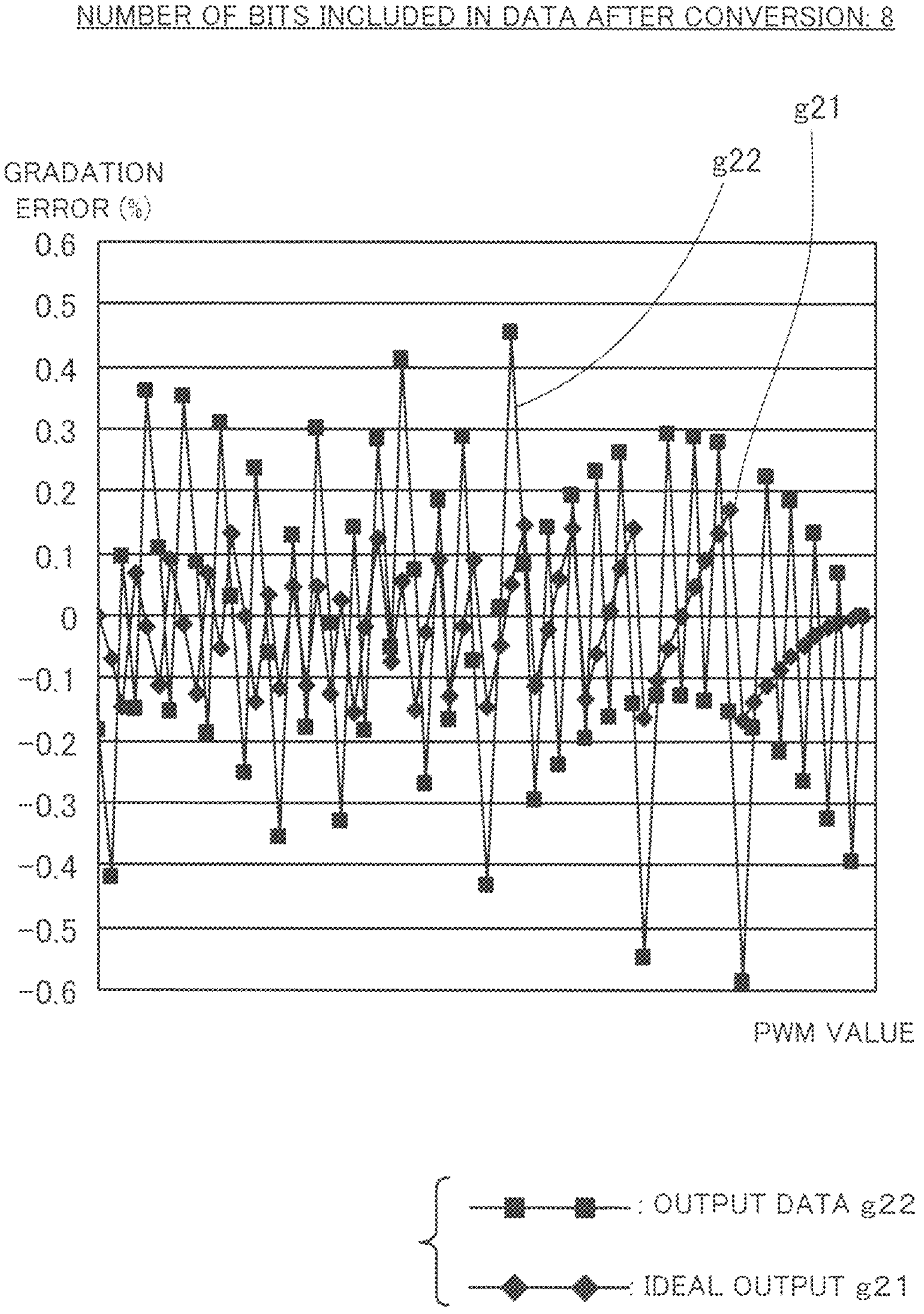
FIG. 14 illustrates simulation results of the correspondence between a gradation error and a PWM value.
Figure 15:
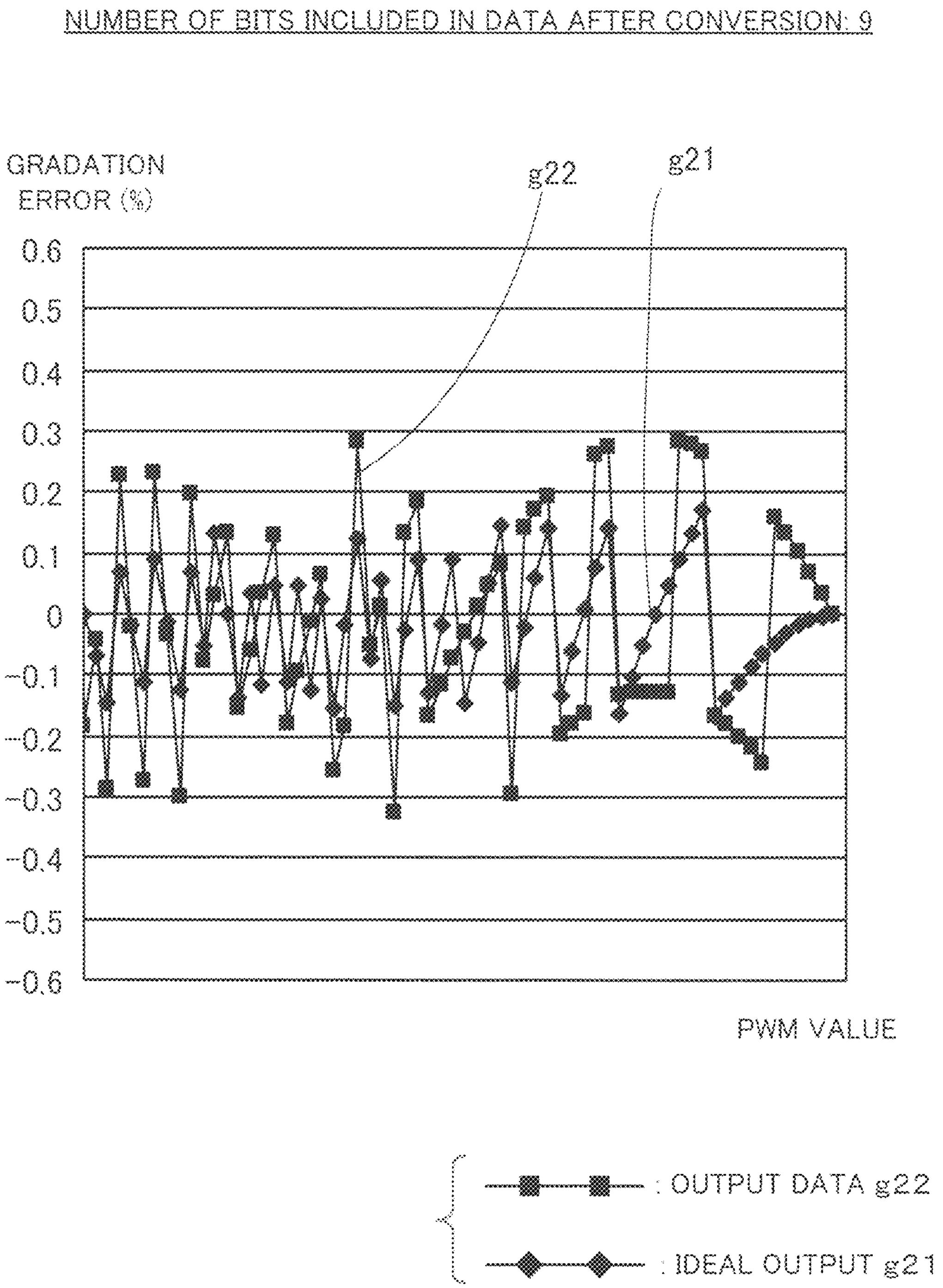
FIG. 15 illustrates simulation results of the correspondence between a gradation error and a PWM value.
Figure 16:
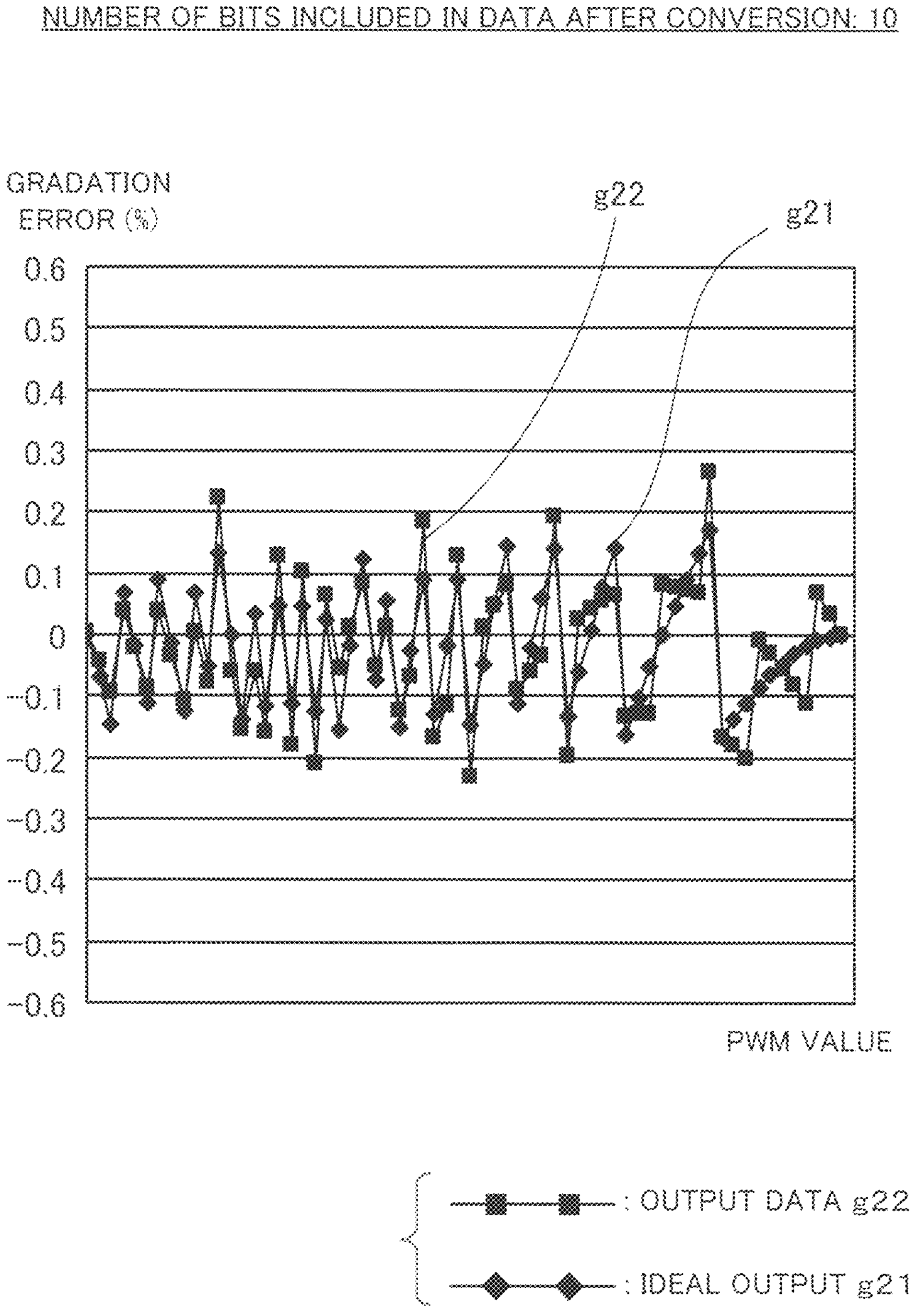
FIG. 16 illustrates simulation results of the correspondence between a gradation error and a PWM value.
Figure 17:
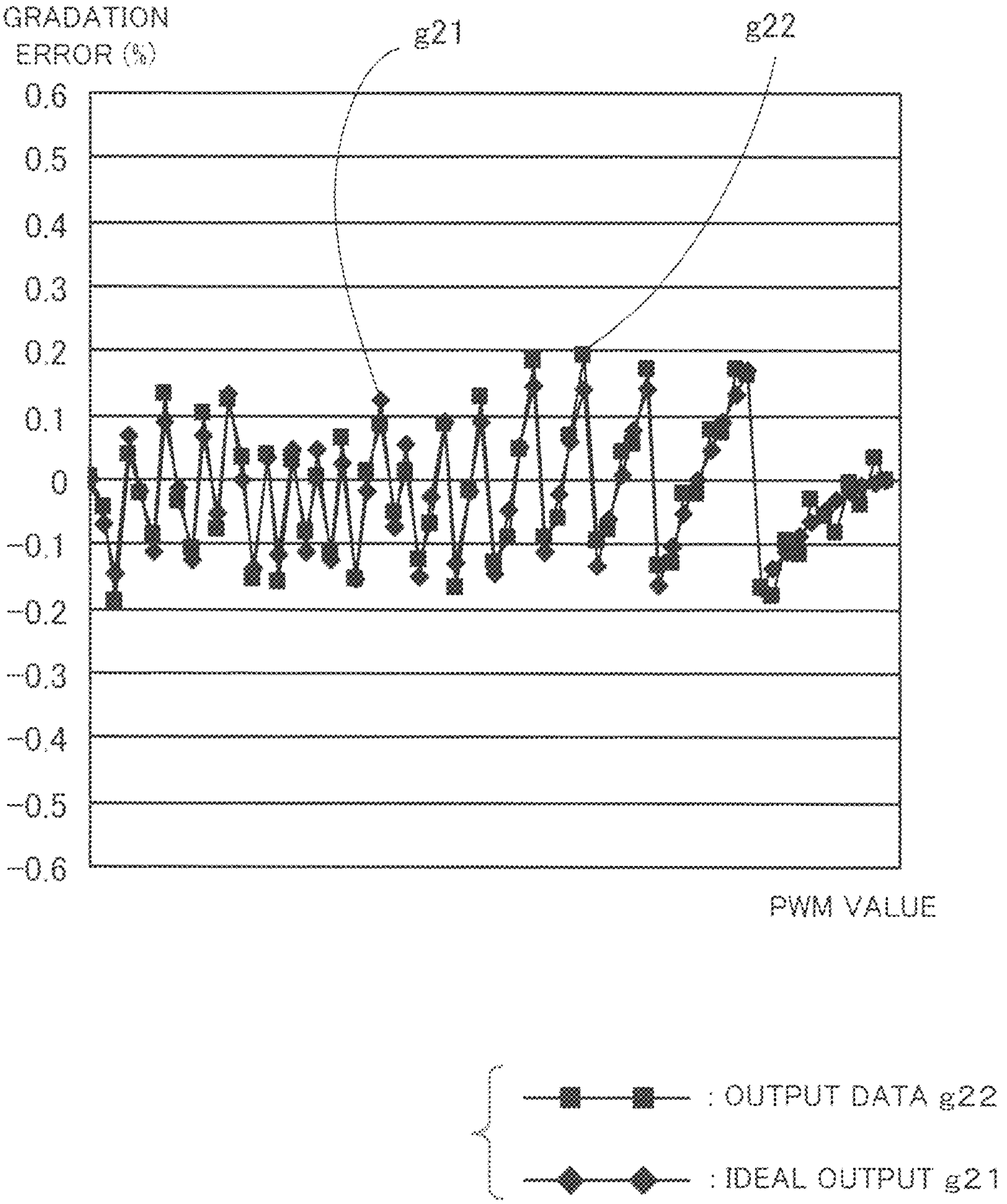
FIG. 17 illustrates simulation results of the correspondence between a gradation error and a PWM value.
Figure 18:
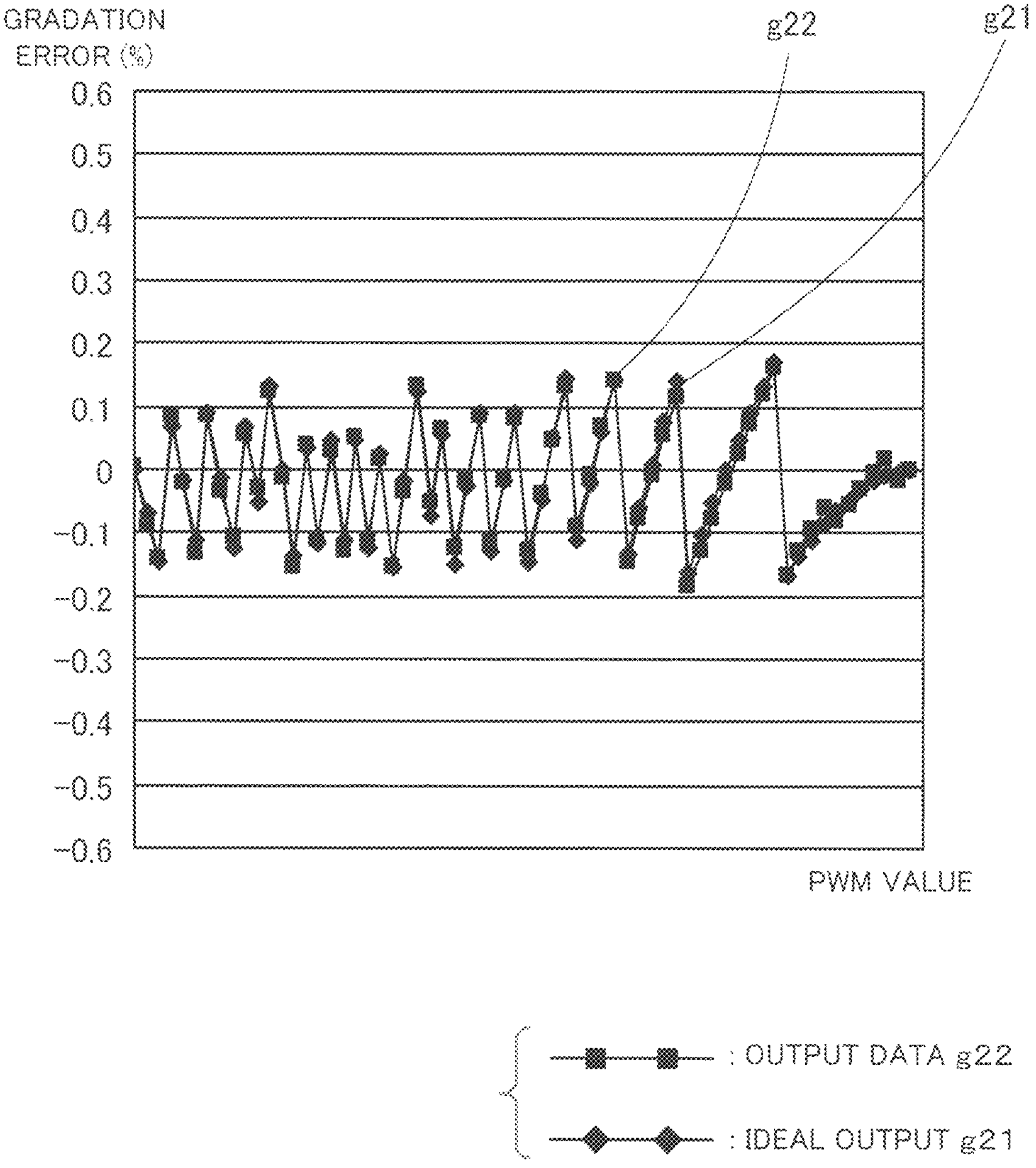
FIG. 18 illustrates simulation results of the correspondence between a gradation error and a PWM value.
Figure 19:
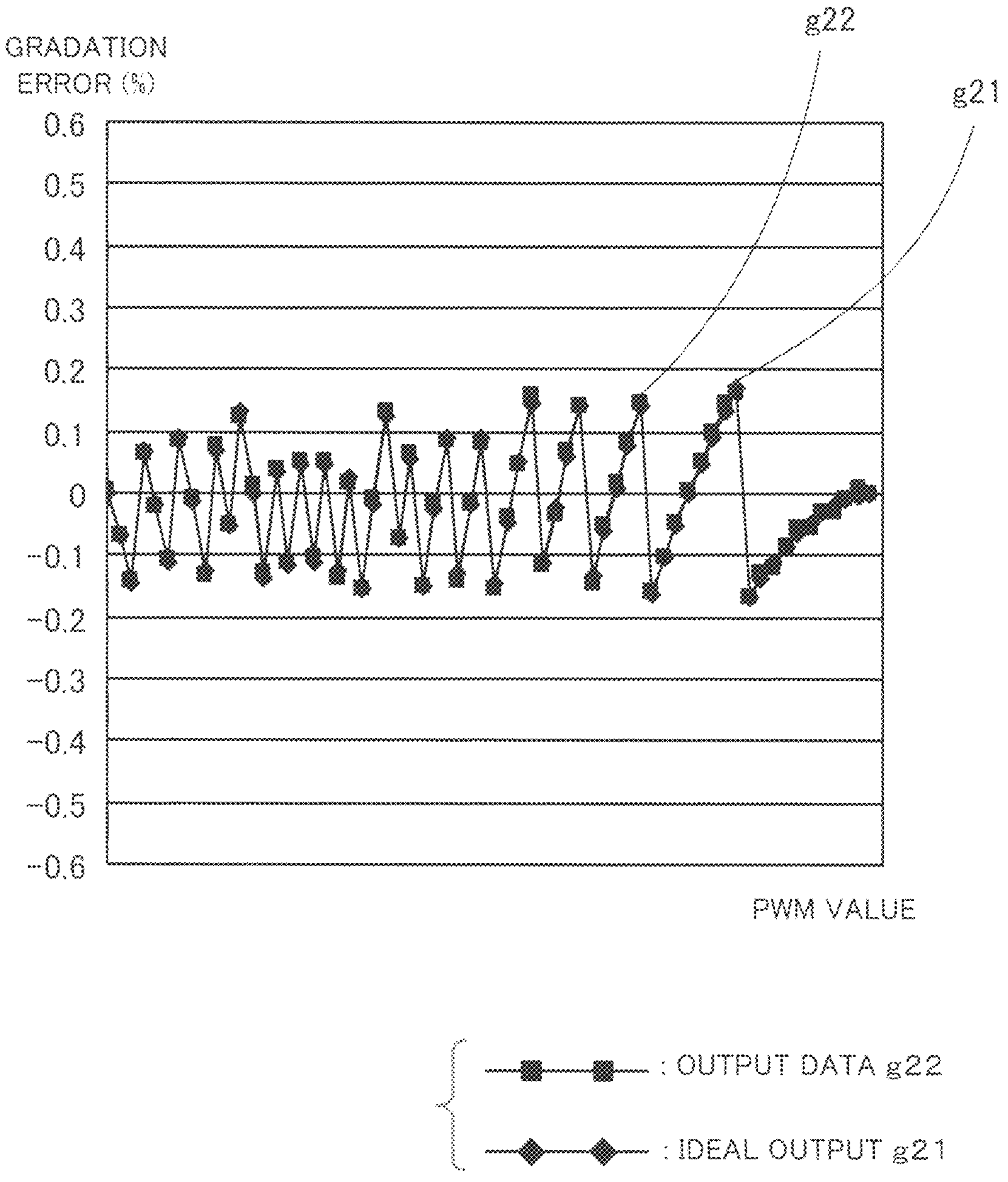
FIG. 19 illustrates simulation results of the correspondence between a gradation error and a PWM value.

FIG. 13 illustrates the input-output characteristic of a reverse gamma conversion section. FIG. 13 illustrates the input-output characteristic of the reverse gamma conversion section 14 illustrated in FIG. 10. In FIG. 13, a horizontal axis indicates data inputted to the reverse gamma conversion section 14 (data outputted from the image signal generation section 13 illustrated in FIG. 10) and a vertical axis indicates data outputted from the reverse gamma conversion section 14 (data after conversion).

The reverse gamma conversion section 14 converts 14-bit input data and outputs 10-bit data. With this data conversion, input data values I1 and I2 are converted to output data values (n+2/4) and (n+3/4) respectively, for example.

In addition, input data values 13, 14, and 15 are converted to output data values (n+1), (n+5/4), and (n+6/4) respectively.

The number of bits is increased so as to reduce a difference in the number of bits between input data and output data and data conversions are made. By doing so, output data values become closer to ideal output. As a result, gradation errors which occur at data conversion time are reduced.

The number of bits is increased at data conversion time so as to exceed the number of bits which a display can display, for example.

That is to say, if the number of bits which a display can display is 8 bits for each signal value, then the reverse gamma conversion section 14 increases the number of bits at data conversion time so that the number of bits included in each signal value included in an RGBW output signal will exceed 8 (10, for example).

FIGS. 14 through 19 illustrate simulation results of the correspondence between a gradation error and a PWM value. In each of FIGS. 14 through 19, a horizontal axis indicates a PWM value and a vertical axis indicates a gradation error (%). A graph g21 indicates ideal output and a graph g22 indicates data outputted from the reverse gamma conversion section 14.

As can be seen from FIGS. 14 through 19, when the number of bits included in data after conversion outputted from the reverse gamma conversion section 14 is increased one by one from 8 to 13, gradation errors (data conversion errors) gradually decrease and data outputted from the reverse gamma conversion section 14 approaches to the graph g21 which indicates ideal output.

As has been described, with the display device 10*a* according to the second embodiment the number of bits included in data after conversion outputted from the reverse gamma conversion section 14 exceeds the number of bits which the display can display.

As a result, gradation errors decrease. Accordingly, the appearance of a false contour or the occurrence of a waving phenomenon is prevented and image quality and visibility are improved.

Third Embodiment

In the third embodiment, gradation errors are reduced by spatially diffusing them. In the above second embodiment, gradation errors are reduced by increasing the number of bits included in data after conversion outputted from the reverse gamma conversion section 14.

Usually, however, the number of input bits which is allowable on a display panel side is determined. Accordingly, it is impossible to increase the number of bits included in output data after conversion to a number greater than the number of input bits which is allowable on a display panel side.

For example, if the number of input bits of each of R, G, B, and W signal which is allowable on a display panel side is 10, then it is impossible for the reverse gamma conversion section 14 to output data after conversion including more than 10 bits.

Accordingly, in the third embodiment gradation errors are reduced without the limitation of the number of input bits which is allowable on a display panel side.

Figure 20:
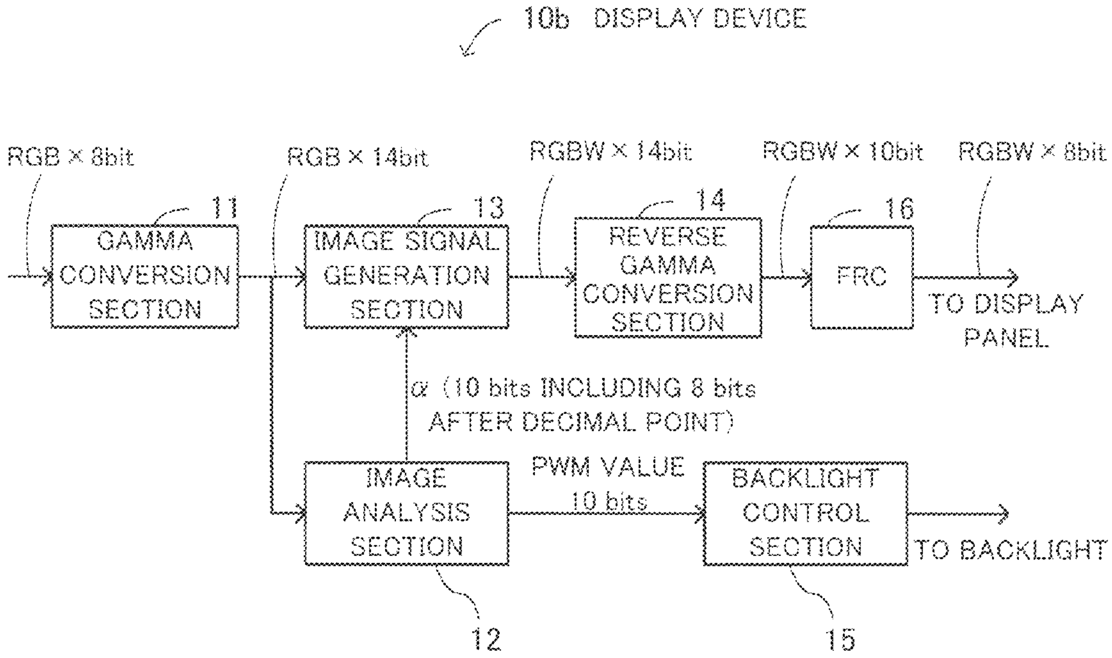
FIG. 20 illustrates an example of the structure of a display device.

FIG. 20 illustrates an example of the structure of a display device. A display device 10*b* according to the third embodiment includes a gamma (γ) conversion section 11, an image analysis section 12, an image signal generation section 13, a reverse gamma (1/γ) conversion section 14, a backlight control section 15, and a frame rate control (FRC) 16. In this connection, any or the whole of the gamma conversion section 11, the image analysis section 12, the image signal generation section 13, the reverse gamma conversion section 14 may be considered as the conversion section 1*a*.

The display device 10*b* illustrated in FIG. 20 differs from the display device 10*a* illustrated in FIG. 10 in that the FRC 16 is arranged behind the reverse gamma conversion section 14. Furthermore, the FRC 16 includes the function of the error dispersion section 1*b* illustrated in FIG. 1.

The FRC 16 performs a dithering process by switching plural frames which make up one gradation image at a high speed, and outputs a signal including bits the number of which is smaller than that of bits included in a signal outputted from the reverse gamma conversion section 14.

The FRC 16 performs a dithering process by displaying one gradation image while switching n frames. At this time M×M pixels in the gradation image are considered as one block for which luminance representation is changed. Positions at which M×M pixels light are changed in each of the n frames.

In the above description, M×M pixels are considered as one block. However, the number of pixels included in one block is not limited to M×M. M×N pixels may be considered as one block. In this case, the number of pixels in a line direction differs from the number of pixels in a dot direction. For example, 4 patterns are generated with 4×1 pixels or 1×4 pixels as one block and a pattern corresponding to a count value is changed according to blocks adjacent to each other in the line or dot direction.

Figure 21:
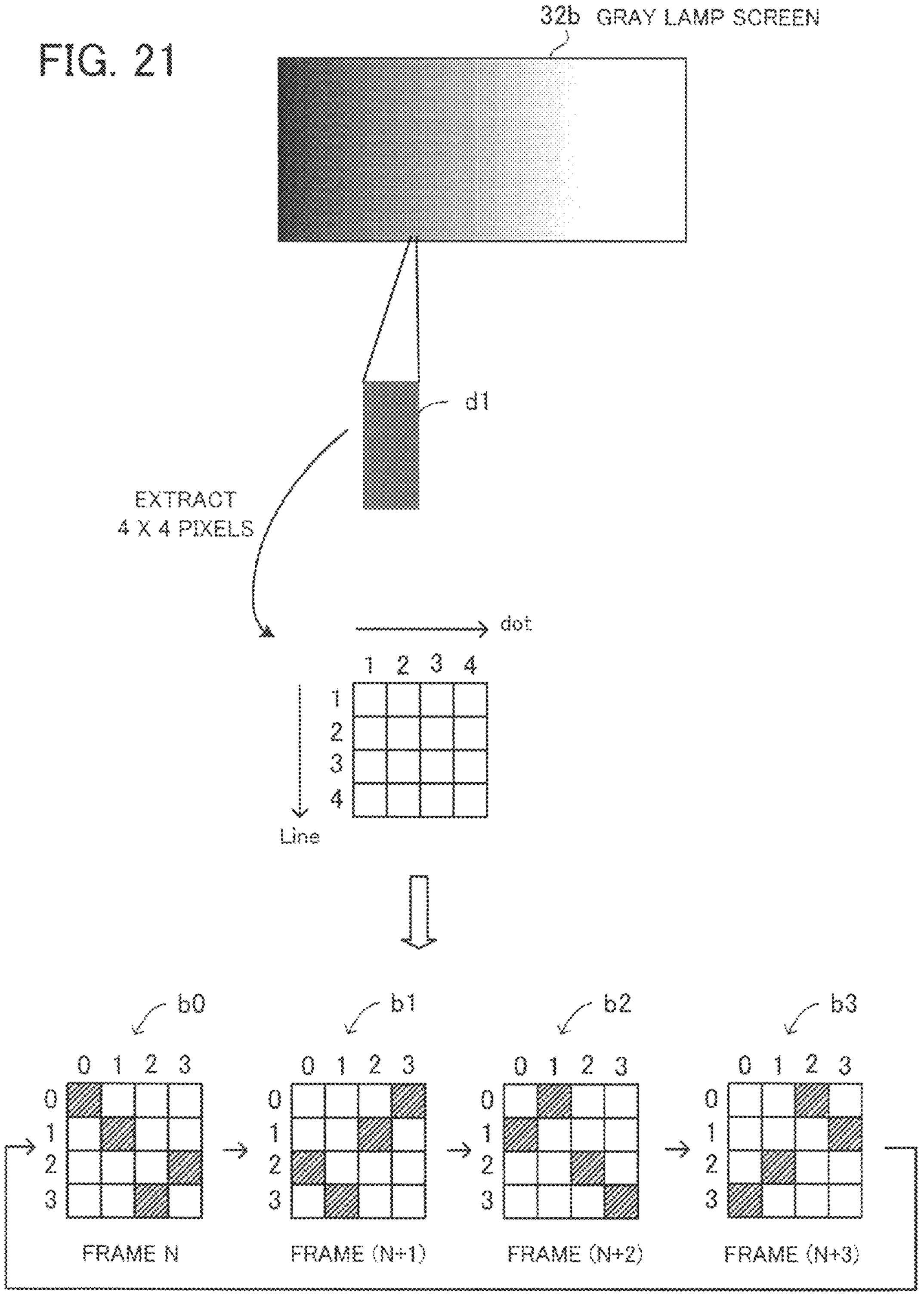
FIG. 21 is a view for giving an overview of a dithering process.

FIG. 21 is a view for giving an overview of a dithering process. In the example of FIG. 21, n=4, that is to say, the FRC 16 performs a dithering process by displaying a gradation image d1 on a gray lamp screen 32*b* while switching 4 frames (frames N, (N+1), (N+2), and (N+3)).

Furthermore, M=4, that is to say, 4×4 pixels in the gradation image d1 are considered as one block for which luminance representation is changed. A position in which 4×4 pixels light is changed in each frame.

In the example of FIG. 21, a pixel lighting pattern (hereinafter also referred to as a dither pattern) in which 4 pixels light in one block is used. Furthermore, dot numbers and line numbers are indicated in the horizontal and vertical directions, respectively, of the block made up of the 4×4 pixels to denote the position of each of the 16 pixels in the block by (dot number (dot), line number (Line)).

In a block b0 in the frame N, pixels at (0, 0), (1, 1), (2, 3), and (3, 2) denoted by (dot, Line) light. In a block b1 in the frame (N+1), pixels at (0, 2), (1, 3), (2, 1), and (3, 0) denoted by (dot, Line) light.

Furthermore, in a block b2 in the frame (N+2), pixels at (0, 1), (1, 0), (2, 2), and (3, 3) denoted by (dot, Line) light. In a block b3 in the frame (N+3), pixels at (0, 3), (1, 2), (2, 0), and (3, 1) denoted by (dot, Line) light.

After the pixels in the block b3 light, the pixel lighting pattern returns again to the block b0 in the frame N and the pixel lighting patterns are repeated in the same way.

Pixel lighting patterns in which 4 pixels in a block light differ among different frames. Furthermore, these 4 different pixel lighting patterns change in the time axis direction (frame N→frame (N+1)→frame (N+2)→frame (N+3)→frame N→ . . . ).

By performing the above dithering process, gradation errors convoluted into data outputted from the reverse gamma conversion section 14 are spatially dispersed.

A dither pattern by which the FRC 16 performs a dithering process on data outputted from the reverse gamma conversion section 14 to spatially disperse gradation errors will now be described. The FRC 16 converts 10-bit data outputted from the reverse gamma conversion section 14 to 8-bit data and outputs the 8-bit data. In this case, for example, it is assumed that the luminance representation of US8.2 is performed by the use of 8-bit data.

"US" is an abbreviation of "unsigned" and means that a sign is not used (positive (+) or negative (−) polarity sign is not used). Furthermore, "8" of "8.2" means 8-bit representation and "0.2" means the 2-bit representation of a decimal.

The 2-bit representation of a decimal is as follows. $0.00_{(10)}$, $0.25_{(10)}$, $0.5_{(10)}$, and $0.75_{(10)}$ are associated with $00_{(2)}$, $01_{(2)}$, $10_{(2)}$, and $11_{(2)}$ respectively, so 4 decimals are represented by 2 bits. That is to say, luminance representation is performed in ¼.

If 2 bits are added to 8-bit representation to represent a decimal, usually 10 bits are required. On the other hand, the FRC 16 switches the 4 frames at a high speed and generates and displays a dither pattern. By doing so, the FRC 16 performs luminance representation by the use of 8 bits including 2 bits for representing a decimal.

For example, if the frames are switched in the order of frame N→frame (N+1)→frame (N+2)→frame (N+3) and all the pixels do not light in all the frames, then the luminance $0.00_{(10)}$ is represented.

Furthermore, if the frames are switched in the order of frame N→frame (N+1)→frame (N+2)→frame (N+3) and one pixel lights in one of the 4 frames, then the luminance $0.250_{(10)}$ is represented.

For example, the following pattern is possible. A pixel lights in the frame N and does not light in the frame (N+1), the frame (N+2), or the frame (N+3). By making a pixel light once in this way by the use of the 4 frames, ¼ gradation is represented.

In addition, if the frames are switched in the order of frame N→frame (N+1)→frame (N+2)→frame (N+3) and a pixel at the same position lights in two of the 4 frames, then the luminance $0.5_{(10)}$ is represented.

For example, the following pattern is possible. A pixel at the same position lights in the frame N, does not light in the frame (N+1), lights in the frame (N+2), and does not light in the frame (N+3). By making a pixel at the same position light twice in this way by the use of the 4 frames, 2/4 gradation is represented.

Moreover, if the frames are switched in the order of frame N→frame (N+1)→frame (N+2)→frame (N+3) and a pixel at the same position lights in three of the 4 frames, then the luminance $0.75_{(10)}$ is represented.

For example, the following pattern is possible. A pixel at the same position lights in the frame N, lights in the frame (N+1), lights in the frame (N+2), and does not light in the frame (N+3). By making a pixel at the same position light three times in this way by the use of the 4 frames, ¾ gradation is represented.

A dither pattern for each of R, G, B, and W signal will now be described. FIG. 22 illustrates a dither pattern. FIG. 22 illustrates a dither pattern Pt1 for an R signal value. 4×4 pixels are considered as one block and dot numbers and line numbers are indicated in the horizontal and vertical directions respectively. "1" in a pixel means that the pixel lights.

(Data 0) All R subpixels do not light in blocks b0 through b3 in frames N, (N+1), (N+2), and (N+3) respectively.

(Data 0.25) In the block b0 in the frame N, the R subpixels at (0, 0), (1, 1), (2, 3), and (3, 2) denoted by (dot, Line) light.

In the block b1 in the frame (N+1), the R subpixels at (0, 3), (1, 2), (2, 0), and (3, 1) denoted by (dot, Line) light.

Furthermore, in the block b2 in the frame (N+2), the R subpixels at (0, 1), (1, 0), (2, 2), and (3, 3) denoted by (dot, Line) light.

In the block b3 in the frame (N+3), the R subpixels at (0, 2), (1, 3), (2, 1), and (3, 0) denoted by (dot, Line) light.

(Data 0.5) In the block b0 in the frame N, the R subpixels at (0, 0), (0, 2), (1, 1), (1, 3), (2, 0), (2, 2), (3, 1), and (3, 3) denoted by (dot, Line) light.

In the block b1 in the frame (N+1), the R subpixels at (0, 1), (0, 3), (1, 0), (1, 2), (2, 1), (2, 3), (3, 0), and (3, 2) denoted by (dot, Line) light.

In the block b2 in the frame (N+2), the R subpixels at (0, 0), (0, 2), (1, 1), (1, 3), (2, 0), (2, 2), (3, 1), and (3, 3) denoted by (dot, Line) light.

In the block b3 in the frame (N+3), the R subpixels at (0, 1), (0, 3), (1, 0), (1, 2), (2, 1), (2, 3), (3, 0), and (3, 2) denoted by (dot, Line) light.

(Data 0.75) In the block b0 in the frame N, the R subpixels at (0, 1), (0, 2), (0, 3), (1, 0), (1, 2), (1, 3), (2, 0), (2, 1), (2, 2), (3, 0), (3, 1), and (3, 3) denoted by (dot, Line) light.

In the block b1 in the frame (N+1), the R subpixels at (0, 0), (0, 1), (0, 2), (1, 0), (1, 1), (1, 3), (2, 1), (2, 2), (2, 3), (3, 0), (3, 2), and (3, 3) denoted by (dot, Line) light.

In the block b2 in the frame (N+2), the R subpixels at (0, 0), (0, 2), (0, 3), (1, 1), (1, 2), (1, 3), (2, 0), (2, 1), (2, 3), (3, 0), (3, 1), and (3, 2) denoted by (dot, Line) light.

In the block b3 in the frame (N+3), the R subpixels at (0, 0), (0, 1), (0, 3), (1, 0), (1, 1), (1, 2), (2, 0), (2, 2), (2, 3), (3, 1), (3, 2), and (3, 3) denoted by (dot, Line) light.

FIG. 23 illustrates a dither pattern. FIG. 23 illustrates a dither pattern Pt2 for a G signal value. 4×4 pixels are considered as one block and dot numbers and line numbers are indicated in the horizontal and vertical directions respectively. "1" in a pixel means that the pixel lights.

(Data 0) All G subpixels do not light in blocks b0 through b3 in frames N, (N+1), (N+2), and (N+3) respectively.

(Data 0.25) In the block b0 in the frame N, the G subpixels at (0, 2), (1, 3), (2, 1), and (3, 0) denoted by (dot, Line) light.

In the block b1 in the frame (N+1), the G subpixels at (0, 0), (1, 1), (2, 3), and (3, 2) denoted by (dot, Line) light.

In the block b2 in the frame (N+2), the G subpixels at (0, 3), (1, 2), (2, 0), and (3, 1) denoted by (dot, Line) light.

In the block b3 in the frame (N+3), the G subpixels at (0, 1), (1, 0), (2, 2), and (3, 3) denoted by (dot, Line) light.

(Data 0.5) In the block b0 in the frame N, the G subpixels at (0, 1), (0, 3), (1, 0), (1, 2), (2, 1), (2, 3), (3, 0), and (3, 2) denoted by (dot, Line) light.

In the block b1 in the frame (N+1), the G subpixels at (0, 0), (0, 2), (1, 1), (1, 3), (2, 0), (2, 2), (3, 1), and (3, 3) denoted by (dot, Line) light.

Furthermore, in the block b2 in the frame (N+2), the G subpixels at (0, 1), (0, 3), (1, 0), (1, 2), (2, 1), (2, 3), (3, 0), and (3, 2) denoted by (dot, Line) light.

In the block b3 in the frame (N+3), the G subpixels at (0, 0), (0, 2), (1, 1), (1, 3), (2, 0), (2, 2), (3, 1), and (3, 3) denoted by (dot, Line) light.

(Data 0.75) In the block b0 in the frame N, the G subpixels at (0, 0), (0, 1), (0, 3), (1, 0), (1, 1), (1, 2), (2, 0), (2, 2), (2, 3), (3, 1), (3, 2), and (3, 3) denoted by (dot, Line) light.

In the block b1 in the frame (N+1), the G subpixels at (0, 1), (0, 2), (0, 3), (1, 0), (1, 2), (1, 3), (2, 0), (2, 1), (2, 2), (3, 0), (3, 1), and (3, 3) denoted by (dot, Line) light.

In the block b2 in the frame (N+2), the G subpixels at (0, 0), (0, 1), (0, 2), (1, 0), (1, 1), (1, 3), (2, 1), (2, 2), (2, 3), (3, 0), (3, 2), and (3, 3) denoted by (dot, Line) light.

In the block b3 in the frame (N+3), the G subpixels at (0, 0), (0, 2), (0, 3), (1, 1), (1, 2), (1, 3), (2, 0), (2, 1), (2, 3), (3, 0), (3, 1), and (3, 2) denoted by (dot, Line) light.

FIG. 24 illustrates a dither pattern. FIG. 24 illustrates a dither pattern Pt3 for a B signal value. 4×4 pixels are considered as one block and dot numbers and line numbers are indicated in the horizontal and vertical directions respectively. "1" in a pixel means that the pixel lights.

(Data 0) All B subpixels do not light in blocks b0 through b3 in frames N, (N+1), (N+2), and (N+3) respectively.

(Data 0.25) In the block b0 in the frame N, the B subpixels at (0, 1), (1, 0), (2, 2), and (3, 3) denoted by (dot, Line) light.

In the block b1 in the frame (N+1), the B subpixels at (0, 2), (1, 3), (2, 1), and (3, 0) denoted by (dot, Line) light.

In the block b2 in the frame (N+2), the B subpixels at (0, 0), (1, 1), (2, 3), and (3, 2) denoted by (dot, Line) light.

In the block b3 in the frame (N+3), the B subpixels at (0, 3), (1, 2), (2, 0), and (3, 1) denoted by (dot, Line) light.

(Data 0.5) In the block b0 in the frame N, the B subpixels at (0, 0), (0, 2), (1, 1), (1, 3), (2, 0), (2, 2), (3, 1), and (3, 3) denoted by (dot, Line) light.

In the block b1 in the frame (N+1), the B subpixels at (0, 1), (0, 3), (1, 0), (1, 2), (2, 1), (2, 3), (3, 0), and (3, 2) denoted by (dot, Line) light.

Furthermore, in the block b2 in the frame (N+2), the B subpixels at (0, 0), (0, 2), (1, 1), (1, 3), (2, 0), (2, 2), (3, 1), and (3, 3) denoted by (dot, Line) light.

In the block b3 in the frame (N+3), the B subpixels at (0, 1), (0, 3), (1, 0), (1, 2), (2, 1), (2, 3), (3, 0), and (3, 2) denoted by (dot, Line) light.

(Data 0.75) In the block b0 in the frame N, the B subpixels at (0, 0), (0, 2), (0, 3), (1, 1), (1, 2), (1, 3), (2, 0), (2, 1), (2, 3), (3, 0), (3, 1), and (3, 2) denoted by (dot, Line) light.

In the block b1 in the frame (N+1), the B subpixels at (0, 0), (0, 1), (0, 3), (1, 0), (1, 1), (1, 2), (2, 0), (2, 2), (2, 3), (3, 1), (3, 2), and (3, 3) denoted by (dot, Line) light.

In the block b2 in the frame (N+2), the B subpixels at (0, 1), (0, 2), (0, 3), (1, 0), (1, 2), (1, 3), (2, 0), (2, 1), (2, 2), (3, 0), (3, 1), and (3, 3) denoted by (dot, Line) light.

In the block b3 in the frame (N+3), the B subpixels at (0, 0), (0, 1), (0, 2), (1, 0), (1, 1), (1, 3), (2, 1), (2, 2), (2, 3), (3, 0), (3, 2), and (3, 3) denoted by (dot, Line) light.

FIG. 25 illustrates a dither pattern. FIG. 25 illustrates a dither pattern Pt4 for a W signal value. 4×4 pixels are considered as one block and dot numbers and line numbers are indicated in the horizontal and vertical directions respectively. “1” in a pixel means that the pixel lights.

(Data 0) All W subpixels do not light in blocks b0 through b3 in frames N, (N+1), (N+2), and (N+3) respectively.

(Data 0.25) In the block b0 in the frame N, the W subpixels at (0, 3), (1, 2), (2, 0), and (3, 1) denoted by (dot, Line) light.

In the block b1 in the frame (N+1), the W subpixels at (0, 1), (1, 0), (2, 2), and (3, 3) denoted by (dot, Line) light.

In the block b2 in the frame (N+2), the W subpixels at (0, 2), (1, 3), (2, 1), and (3, 0) denoted by (dot, Line) light.

In the block b3 in the frame (N+3), the W subpixels at (0, 0), (1, 1), (2, 3), and (3, 2) denoted by (dot, Line) light.

(Data 0.5) In the block b0 in the frame N, the W subpixels at (0, 0), (0, 2), (1, 1), (1, 3), (2, 0), (2, 2), (3, 1), and (3, 3) denoted by (dot, Line) light.

In the block b1 in the frame (N+1), the W subpixels at (0, 1), (0, 3), (1, 0), (1, 2), (2, 1), (2, 3), (3, 0), and (3, 2) denoted by (dot, Line) light.

Furthermore, in the block b2 in the frame (N+2), the W subpixels at (0, 0), (0, 2), (1, 1), (1, 3), (2, 0), (2, 2), (3, 1), and (3, 3) denoted by (dot, Line) light.

In the block b3 in the frame (N+3), the W subpixels at (0, 1), (0, 3), (1, 0), (1, 2), (2, 1), (2, 3), (3, 0), and (3, 2) denoted by (dot, Line) light.

(Data 0.75) In the block b0 in the frame N, the W subpixels at (0, 0), (0, 1), (0, 2), (1, 0), (1, 1), (1, 3), (2, 1), (2, 2), (2, 3), (3, 0), (3, 2), and (3, 3) denoted by (dot, Line) light.

In the block b1 in the frame (N+1), the W subpixels at (0, 0), (0, 2), (0, 3), (1, 1), (1, 2), (1, 3), (2, 0), (2, 1), (2, 3), (3, 0), (3, 1), and (3, 2) denoted by (dot, Line) light.

In the block b2 in the frame (N+2), the W subpixels at (0, 0), (0, 1), (0, 3), (1, 0), (1, 1), (1, 2), (2, 0), (2, 2), (2, 3), (3, 1), (3, 2), and (3, 3) denoted by (dot, Line) light.

In the block b3 in the frame (N+3), the W subpixels at (0, 1), (0, 2), (0, 3), (1, 0), (1, 2), (1, 3), (2, 0), (2, 1), (2, 2), (3, 0), (3, 1), and (3, 3) denoted by (dot, Line) light.

Figure 26:
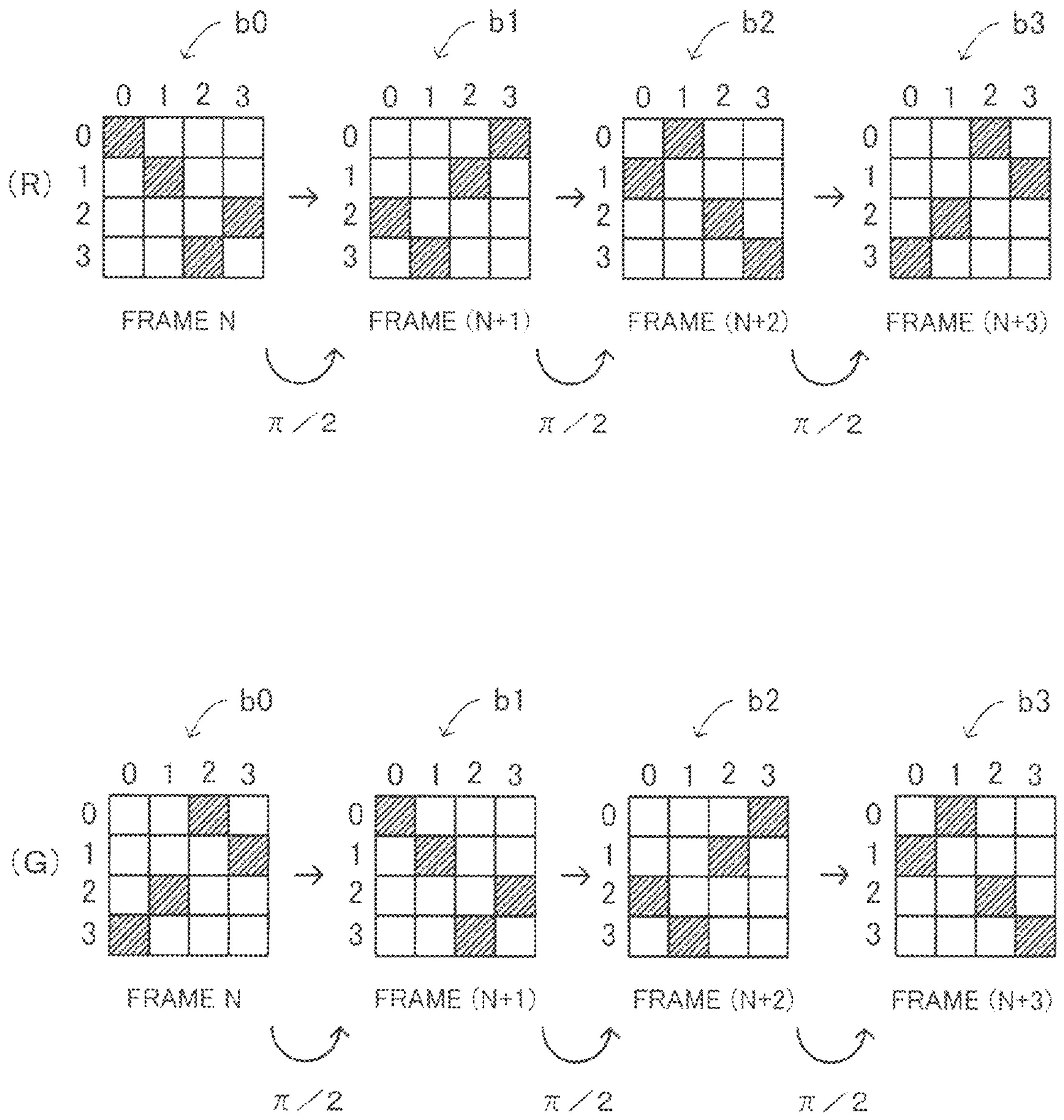
FIG. 26 illustrates a dither pattern generation method.
Figure 27:
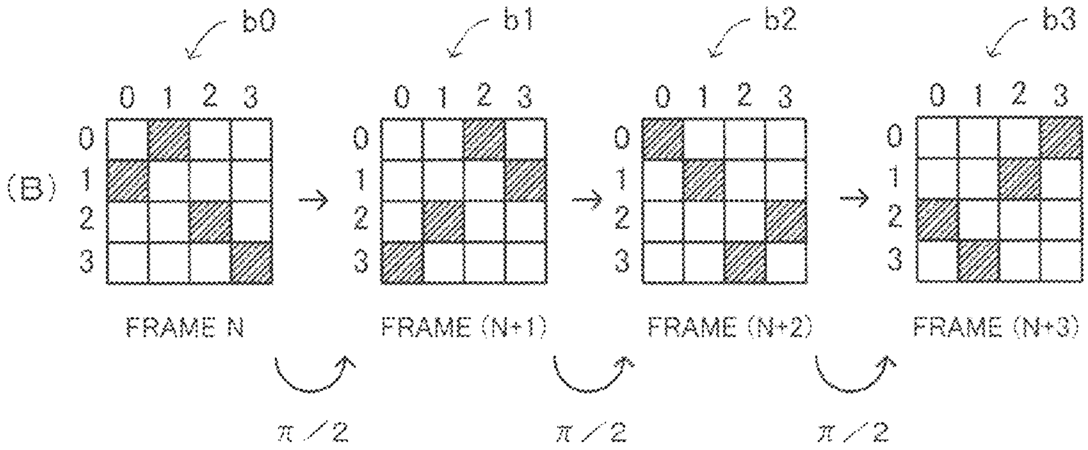
FIG. 27 illustrates a dither pattern generation method.
Figure 27:
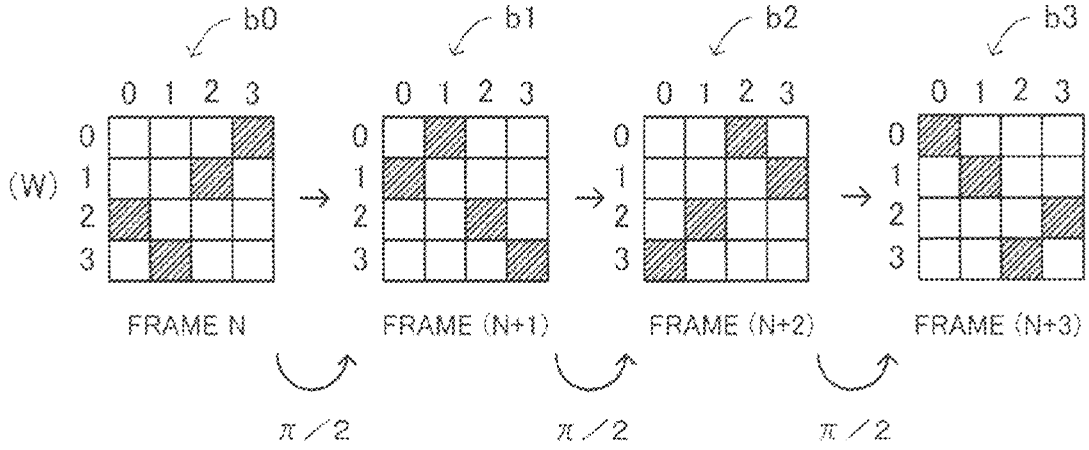

A dither pattern generation method (characteristics of the dither patterns illustrated in FIGS. 22 through 25) will now be described. Each of FIGS. 26 and 27 illustrates a dither pattern generation method. A dither pattern for each of R, G, B, and W signal is generated so that a subpixel lighting pattern of a block will be obtained by rotating a subpixel lighting pattern of an adjacent block by π/2. Each of FIGS. 26 and 27 illustrates only a part of the dither pattern corresponding to the decimal 0.25.

The R subpixel lighting pattern of the block b1 in the frame (N+1) is obtained by rotating the R subpixel lighting pattern of the block b0 in the frame N clockwise by π/2.

Furthermore, the R subpixel lighting pattern of the block b2 in the frame (N+2) is obtained by rotating the R subpixel lighting pattern of the block b1 in the frame (N+1) clockwise by π/2.

In addition, the R subpixel lighting pattern of the block b3 in the frame (N+3) is obtained by rotating the R subpixel lighting pattern of the block b2 in the frame (N+2) clockwise by π/2.

The G subpixel lighting pattern of the block b1 in the frame (N+1) is obtained by rotating the G subpixel lighting pattern of the block b0 in the frame N clockwise by π/2.

Furthermore, the G subpixel lighting pattern of the block b2 in the frame (N+2) is obtained by rotating the G subpixel lighting pattern of the block b1 in the frame (N+1) clockwise by π/2.

In addition, the G subpixel lighting pattern of the block b3 in the frame (N+3) is obtained by rotating the G subpixel lighting pattern of the block b2 in the frame (N+2) clockwise by π/2.

The B subpixel lighting pattern of the block b1 in the frame (N+1) is obtained by rotating the B subpixel lighting pattern of the block b0 in the frame N clockwise by π/2.

Furthermore, the B subpixel lighting pattern of the block b2 in the frame (N+2) is obtained by rotating the B subpixel lighting pattern of the block b1 in the frame (N+1) clockwise by π/2.

In addition, the B subpixel lighting pattern of the block b3 in the frame (N+3) is obtained by rotating the B subpixel lighting pattern of the block b2 in the frame (N+2) clockwise by π/2.

The W subpixel lighting pattern of the block b1 in the frame (N+1) is obtained by rotating the W subpixel lighting pattern of the block b0 in the frame N clockwise by π/2.

Furthermore, the W subpixel lighting pattern of the block b2 in the frame (N+2) is obtained by rotating the W subpixel lighting pattern of the block b1 in the frame (N+1) clockwise by π/2.

In addition, the W subpixel lighting pattern of the block b3 in the frame (N+3) is obtained by rotating the W subpixel lighting pattern of the block b2 in the frame (N+2) clockwise by π/2.

As has been described, a dither pattern is generated so that a subpixel lighting pattern of the block in the frame (N+1) will be obtained by rotating a subpixel lighting pattern of the block in the frame N by π/2. As a result, errors are diffused. In addition, a situation in which there appears a locally bright or dark portion on a screen is prevented. That is to say, uniform brightness is realized.

Figure 28:
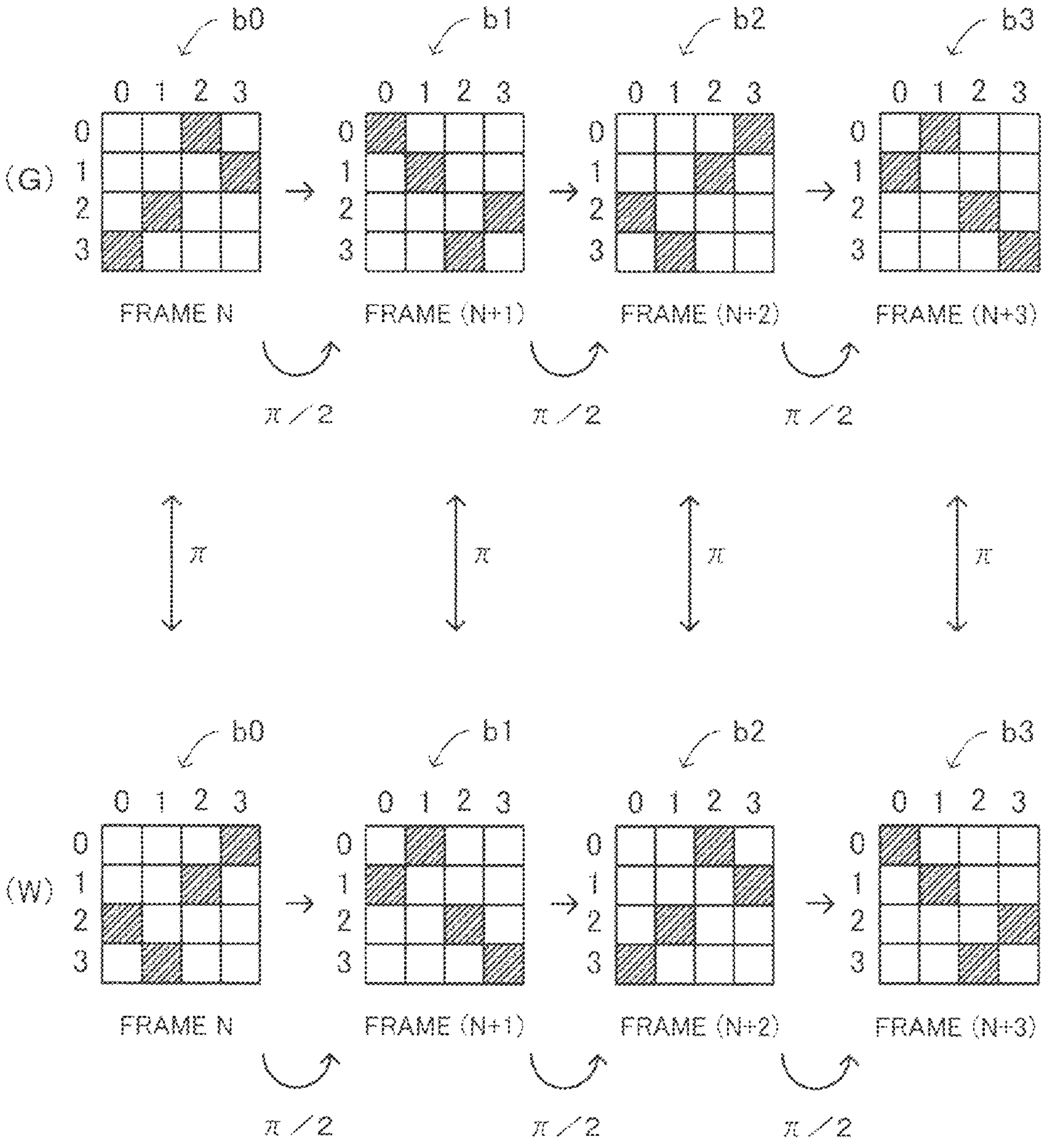
FIG. 28 illustrates a dither pattern generation method.

FIG. 28 illustrates a dither pattern generation method. In the above dither pattern generation method, a dither pattern for each of R, G, B, and W signal values is generated so that a subpixel lighting pattern of a block will be obtained by rotating a subpixel lighting pattern of an adjacent block by π/2.

Of the R, G, B, and W subpixels, the luminance of the G and W subpixels is high. Accordingly, a dither pattern is generated so that a G subpixel lighting pattern in a frame will be obtained by rotating a W subpixel lighting pattern in the frame by π and so that the W subpixel lighting pattern in the frame will be obtained by rotating the G subpixel lighting pattern in the frame by H. FIG. 28 illustrates only a part of the dither pattern corresponding to the decimal 0.25.

The G subpixel lighting pattern of the block b0 in the frame N is obtained by rotating the W subpixel lighting pattern of the block b0 in the frame N by π and the W subpixel lighting pattern of the block b0 in the frame N is obtained by rotating the G subpixel lighting pattern of the block b0 in the frame N by π.

Furthermore, the G subpixel lighting pattern of the block b1 in the frame (N+1) is obtained by rotating the W subpixel lighting pattern of the block b1 in the frame (N+1) by π and the W subpixel lighting pattern of the block b1 in the frame (N+1) is obtained by rotating the G subpixel lighting pattern of the block b1 in the frame (N+1) by π.

The G subpixel lighting pattern of the block b2 in the frame (N+2) is obtained by rotating the W subpixel lighting pattern of the block b2 in the frame (N+2) by π and the W subpixel lighting pattern of the block b2 in the frame (N+2) is obtained by rotating the G subpixel lighting pattern of the block b2 in the frame (N+2) by π.

In addition, the G subpixel lighting pattern of the block b3 in the frame (N+3) is obtained by rotating the W subpixel lighting pattern of the block b3 in the frame (N+3) by π and the W subpixel lighting pattern of the block b3 in the frame (N+3) is obtained by rotating the G subpixel lighting pattern of the block b3 in the frame (N+3) by π.

As has been described, the luminance of the two subpixels of the plural subpixels is high. Accordingly, a dither pattern is generated so that a lighting pattern of one of the two subpixels will differ from a lighting pattern of the other in a block in the same frame made up of M×M pixels.

It is more desirable to arrange a position at which a subpixel whose luminance is the highest lights and a position at which a subpixel whose luminance is the next highest lights so as to set the greatest distance between them.

That is to say, in a block in the same frame made up of M×M pixels, a G subpixel lighting pattern is obtained by rotating a W subpixel lighting pattern by n and the W subpixel lighting pattern is obtained by rotating the G subpixel lighting pattern by n. As a result, errors are diffused. In addition, a situation in which there appears a locally bright or dark portion on a screen is prevented. That is to say, uniform brightness is realized.

A measure to prevent uneven distribution of direct current (DC) components in control of output from the FRC 16 will now be described. As stated above, frame switching is performed with 4 frames as one cycle to change a dither pattern. In this case, a phenomenon, such as screen sticking, may occur on a liquid crystal display due to uneven distribution of DC components.

FIG. 29 is a view for describing uneven distribution of DC components. FIG. 29 illustrates a part of the dither pattern for an R signal value. According to the dither pattern for an R signal value corresponding to the data 0.25, the subpixel at (0, 0) in the block b0 in the frame N denoted by (dot, Line) lights, and the subpixel at the same position (0, 0) in the block b1 in the frame (N+1), in the block b2 in the frame (N+2), or in the block b3 in the frame (N+3) denoted by (dot, Line) does not light.

If frame switching is performed with 4 frames as one cycle, that is to say, in the order of frame N→frame (N+1)→frame (N+2)→frame (N+3) frame N . . . , then the subpixel at (0, 0) denoted by (dot, Line) always lights only in the frame N. As a result, DC components are unevenly distributed at this position and a phenomenon, such as screen sticking, may occur on a liquid crystal display.

Figure 30:
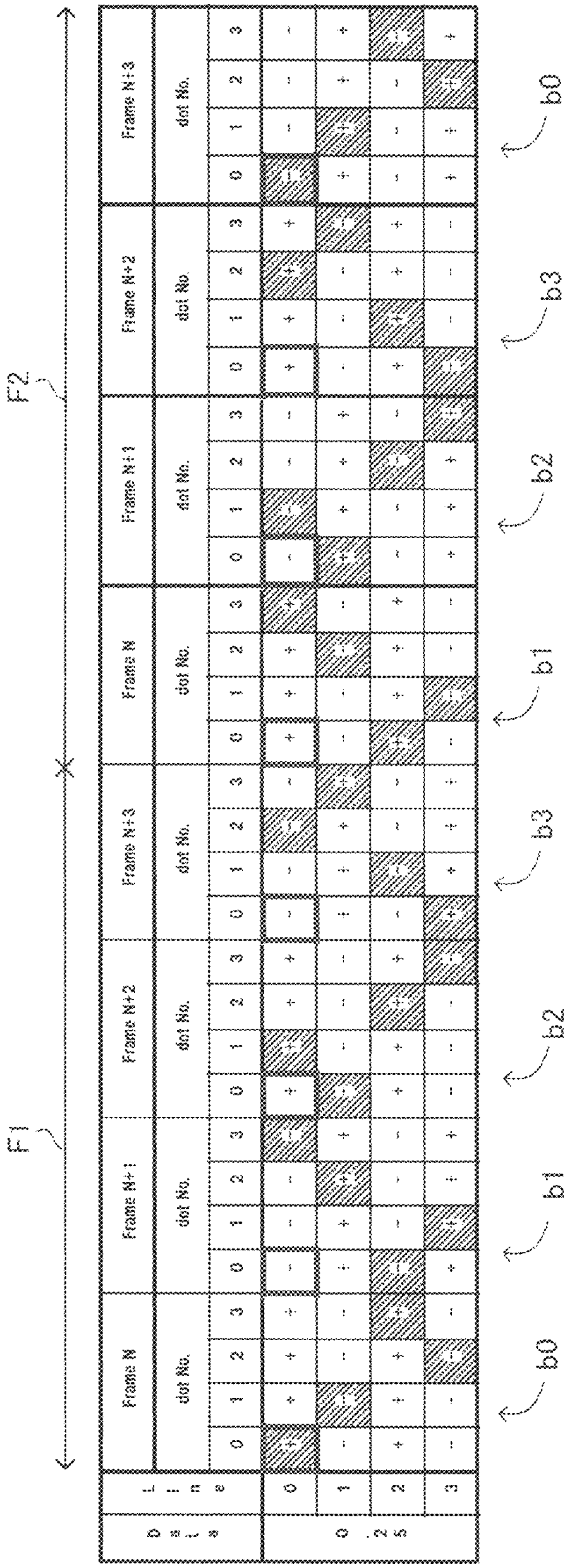
FIG. 30 illustrates a measure to prevent uneven distribution of DC components.

FIG. 30 illustrates a measure to prevent uneven distribution of DC components.

(Cycle F1) The subpixel at (0, 0) in the block b0 in the frame N denoted by (dot, Line) lights. Furthermore, the subpixel at the same position (0, 0) in the block b1 in the frame (N+1), in the block b2 in the frame (N+2), or in the block b3 in the frame (N+3) denoted by (dot, Line) does not light.

(Cycle F2) The block b1 is assigned to the frame N, the block b2 is assigned to the frame (N+1), the block b3 is assigned to the frame (N+2), and the block b0 is assigned to the frame (N+3).

Accordingly, the subpixel at (3, 0) in the block b1 in the frame N denoted by (dot, Line) lights. Furthermore, the subpixel at the same position (3, 0) in the block b2 in the frame (N+1), in the block b3 in the frame (N+2), or in the block b0 in the frame (N+3) denoted by (dot, Line) does not light.

For example, the above control is realized by changing a count starting value of a frame counter. For example, it is assumed that the frames N, (N+1), (N+2), and (N+3) are counted by the use of the count values 0, 1, 2, and 3 of the frame counter and that 16 subpixels included in a line of the frame N, a line of the frame (N+1), a line of the frame (N+2), and a line of the frame (N+3) are counted by the use of the count values 0 through 15 of a reset counter.

In this case, a frame count value starts from 0 in the cycle F1 with the count value 0 of the frame counter associated with the count value 0 of the reset counter. Next, a frame count value starts from 1 in the cycle F2 with the count value 1 of the frame counter associated with the count value 0 of the reset counter.

As has been described, frame switching is performed with n frames as one cycle. In this case, a subpixel lighting pattern in a first cycle differs from a subpixel lighting pattern in a second cycle. That is to say, the position of a subpixel which lights in the first cycle differs from the position of a subpixel which lights in the second cycle.

To be concrete, it is assumed that drive control is exercised so that polarity (+ or −) in each pixel on a display panel (example of the display panel section 1*c*) will be inverted every frame. Each time a cycle made up of frames ends, the correspondence between a frame number and a block number is changed so that polarity (+ or −) at the time of the same pixel lighting will change. By exercising such control, a state in which only the same pixel in the same frame always lights is avoided. As a result, uneven distribution of DC components is prevented.

In FIG. 30, polarity (+ or −) is inverted every frame. However, polarity (+ or −) may be inverted in two or more frames. Accordingly, the number of blocks to be shifted may be changed. Furthermore, in the above example, 4 blocks are generated and a block assigned to each frame is changed by the use of counters. However, in order to prevent uneven distribution of DC components, inversion drive according to pixels is taken into consideration and one cycle may be set by adding the above cycles F1 and F2.

As has been described, with the display device 10*b* according to the third embodiment M×M pixels in a gradation image are considered as one block for which luminance representation is changed. Positions at which pixels in a block in each of n frames light are changed so that pixel lighting patterns of blocks will differ among the different frames. By doing so, gradation errors are spatially dispersed.

As a result, gradation errors are reduced. Accordingly, the appearance of a false contour or the occurrence of a waving phenomenon is prevented and image quality and visibility are improved.

Figure 31:
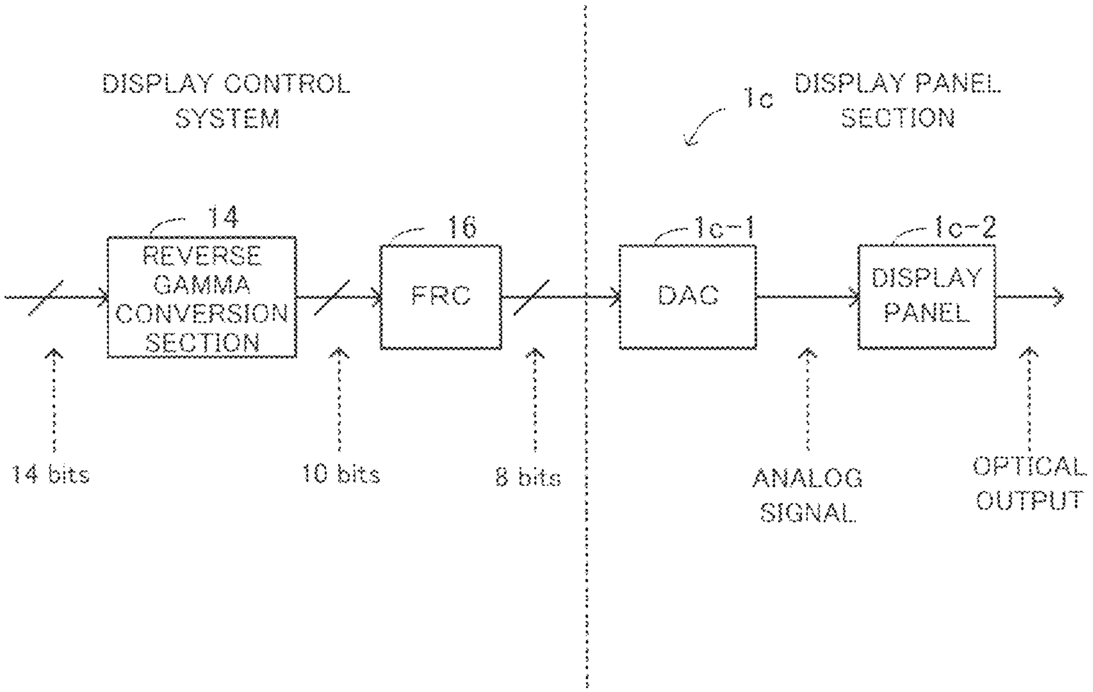
FIG. 31 illustrates an example of the number of bits included in input and output signals around an FRC.

FIG. 31 illustrates an example of the number of bits included in input and output signals around the FRC. The reverse gamma conversion section 14 of the display device 10*b* converts a 14-bit input signal to a 10-bit signal and outputs the 10-bit signal. The FRC 16 converts the 10-bit input signal to an 8-bit signal and outputs the 8-bit signal.

On the other hand, a display panel section 1*c* includes a D/A converter (DAC) 1*c*-1 which makes digital-to-analog conversion and a display panel 1*c*-2 which is a display for displaying an image signal. The DAC 1*c*-1 converts the 8-bit digital signal to an analog signal. The display panel 1*c*-2 outputs an optical image signal on the basis of the voltage of the analog signal.

As has been described, in the display device 10*b* according to the third embodiment, the FRC 16 is arranged behind the reverse gamma conversion section 14 and outputs a signal including bits the number of which is smaller than that of bits included in a signal outputted from the reverse gamma conversion section 14.

Accordingly, the reverse gamma conversion section 14 included in the display device 10*b* makes a conversion so that the number of bits included in an output signal after the conversion will exceed the number of input bits which is allowable on a display panel side. Accordingly, gradation errors are reduced at this stage.

Furthermore, the FRC 16 spatially disperses gradation errors which remain in the output signal from the reverse gamma conversion section 14 within the range of the number of input bits which is allowable on the display panel side. As a result, gradation errors are reduced further.

Fourth Embodiment

Figure 32:
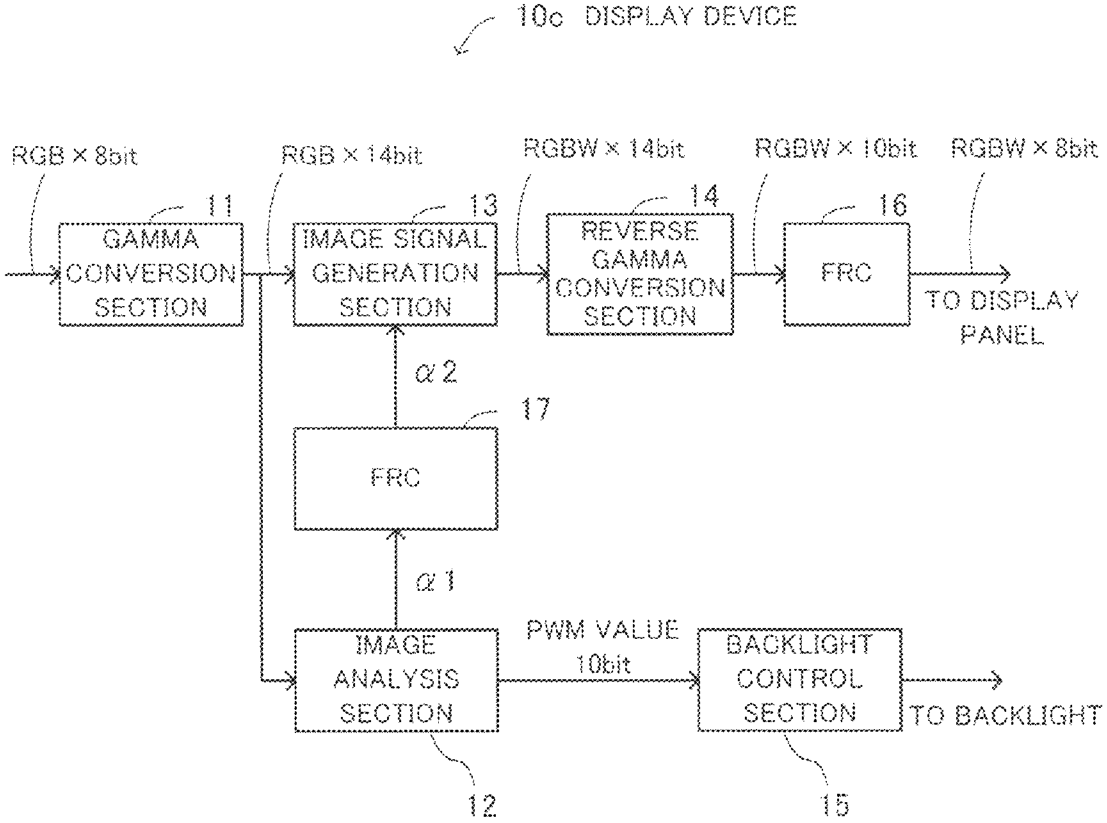
FIG. 32 illustrates an example of the structure of a display device.

In the fourth embodiment an FRC also performs a dithering process on the expansion coefficient α to diffuse gradation errors. FIG. 32 illustrates an example of the structure of a display device. A display device 10*c* according to the fourth embodiment includes a gamma (γ) conversion section 11, an image analysis section 12 (corresponding to an expansion coefficient calculation section), an image signal generation section 13 (corresponding to a fourth subpixel generation section), a reverse gamma (1/γ) conversion section 14, a backlight control section 15, an FRC 16, and an FRC 17 (corresponding to an expansion coefficient error dispersion section). In this connection, any of the gamma conversion section 11, the image analysis section 12, the image signal generation section 13, and the reverse gamma conversion section 14 may be considered as the conversion section 1*a*. Further, a plurality of conversion processes performed by the gamma conversion section 11 and image analysis section 12 (first conversion section) and the image signal generation section 13 and reverse gamma conversion section 14 (second conversion section) may be performed by the conversion section 1*a*. Still further, one or both of the FRC 16 (first error dispersion section) and the FRC 17 (second error dispersion section) may be considered as the error dispersion section 1*b*.

The display device 10*c* illustrated in FIG. 31 differs from the display device 10*b* illustrated in FIG. 20 in that the FRC 17 is arranged between the image analysis section 12 and the image signal generation section 13.

The gamma conversion section 11 gamma-converts an input RGB signal including an 8-bit R signal value, an 8-bit G signal value, and an 8-bit B signal value, and outputs an RGB signal including a 14-bit R signal value, a 14-bit G signal value, and a 14-bit B signal value. When the image analysis section 12 receives the RGB signal outputted from the gamma conversion section 11, the image analysis section 12 calculates an expansion coefficient α1 (first expansion coefficient) and generates a PWM value.

The FRC 17 performs a dithering process on errors which occur at the time of generating the expansion coefficient α1, diffuses the errors, and generates an expansion coefficient α2 (second expansion coefficient). The number of bits included in the expansion coefficient α2 is smaller than that of bits included in the expansion coefficient α1.

The image signal generation section 13 generates a W signal on the basis of the expansion coefficient α2 and outputs an RGBW signal including a 14-bit R signal value, a 14-bit G signal value, a 14-bit B signal value, and a 14-bit W signal value.

The reverse gamma conversion section 14 performs reverse gamma conversion on the RGBW signal outputted from the image signal generation section 13 to generate an RGBW signal including a 10-bit R signal value, a 10-bit G signal value, a 10-bit B signal value, and a 10-bit W signal value. The FRC 16 performs a dithering process by switching plural frames which make up one gradation image at a high speed, and generates a display control signal including bits the number of which is smaller than that of bits included in the signal outputted from the reverse gamma conversion section 14.

The backlight control section 15 controls the luminance of a backlight on the basis of the PWM value outputted from the image analysis section 12.

With the above display device 10*c* according to the fourth embodiment, the FRC 17 disperses by a dithering process errors which occur at the time of calculating the expansion coefficient α1 used for generating a W signal value, and generates the expansion coefficient α2 including bits the number of which is smaller than that of bits included in the expansion coefficient α1.

As a result, gradation errors are reduced. Accordingly, the appearance of a false contour or the occurrence of a waving phenomenon is prevented and image quality and visibility are improved.

Figure 33:
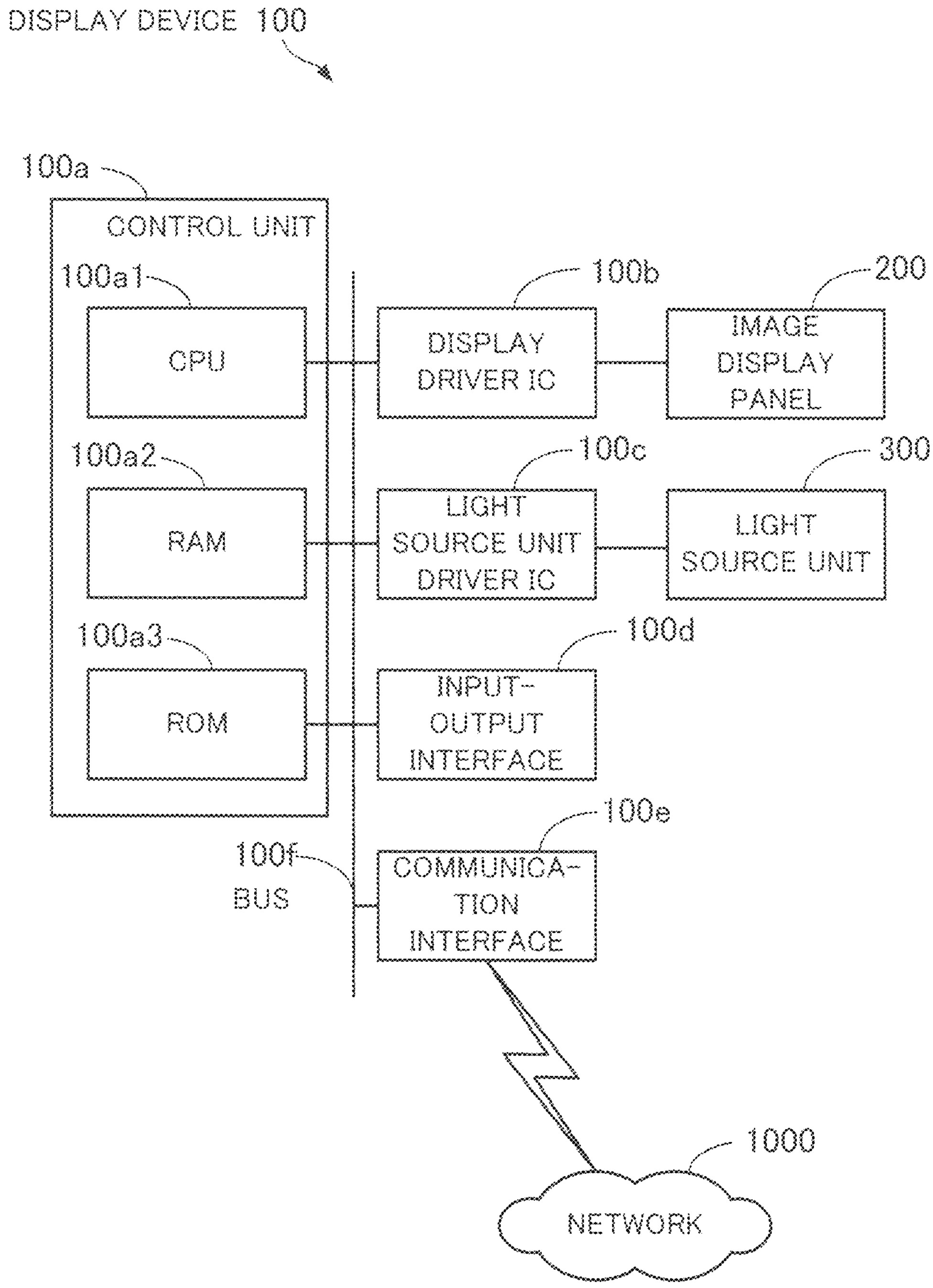
FIG. 33 illustrates an example of the hardware configuration of a display device.

An example of the hardware configuration of a display device will now be described. FIG. 33 illustrates an example of the hardware configuration of a display device.

A display device 100 includes a control unit 100*a*, a display driver integrated circuit (IC) 100*b*, a light source unit driver IC 100*c*, an input-output interface 100*d*, and a communication interface 100*e* which are connected to one another via a bus 100*f* so as to input or output a signal. Furthermore, the display device 100 includes an image display panel 200 and a light source unit 300.

The control unit 100*a* includes a central processing unit (CPU) 100*a*1 and the whole of the control unit 100*a* is controlled by the CPU 100*a*1. Furthermore, the control unit 100*a* includes a random access memory (RAM) 100*a*2 and a read-only memory (ROM) 100*a*3 and a plurality of peripheral units are connected to the control unit 100*a*.

The RAM 100*a*2 is used as main storage of the display device 100. The RAM 100*a*2 temporarily stores at least a part of an operating system (OS) program or an application program executed by the CPU 100*a*1. In addition, the RAM 100*a*2 stores various pieces of data which the CPU 100*a*1 needs to perform a process.

The ROM 100*a*3 is a read-only semiconductor memory and stores an OS program, an application program, and fixed data which is not rewritten. Furthermore, a semiconductor memory, such as a flash memory, may be used as auxiliary storage in place of the ROM 100*a*3 or in addition to the ROM 100*a*3.

For example, the display driver IC 100*b*, the light source unit driver IC 100*c*, the input-output interface 100*d*, and the communication interface 100*e* are connected to the above control unit 100*a* as peripheral units.

The image display panel 200 is connected to the display driver IC 100*b*. When an input signal is inputted to the display driver IC 100*b*, the display driver IC 100*b* performs a determined process to generate an output signal. The display driver IC 100*b* outputs a control signal corresponding to the generated output signal to the image display panel 200. By doing so, the display driver IC 100*b* makes the image display panel 200 display an image.

The functions of the conversion section 1*a*, the error dispersion section 1*b*, and the display panel section 1*c* illustrated in FIG. 1 may be performed by the CPU 100*a*1 or the display driver IC 100*b*. Alternatively, some of the functions of the conversion section 1*a*, the error dispersion section 1*b*, and the display panel section 1*c* illustrated in FIG. 1 may be performed by the CPU 100*a*1 and the others may be performed by the display driver IC 100*b*.

Each light source included in a sidelight light source included in the light source unit 300 is connected to the light source unit driver IC 100*c*. The light source unit driver IC 100*c* drives each light source according to a light source control signal and controls the luminance of the light source unit 300. Each light source is a light-emitting diode (LED), for example.

An input device used for inputting a user's instructions is connected to the input-output interface 100*d*. An input device, such as a keyboard, a mouse used as a pointing device, or a touch panel, is connected. The input-output interface 100*d* transmits to the CPU 100*a*1 via the bus 100*f* a signal transmitted from the input device.

The communication interface 100*e* is connected to a network 1000. The communication interface 100*e* transmits data to or receives data from another computer or a communication apparatus via the network 1000.

The display device 100 realizes the processing functions in the above embodiments by adopting the above hardware configuration, for example.

Figure 34:
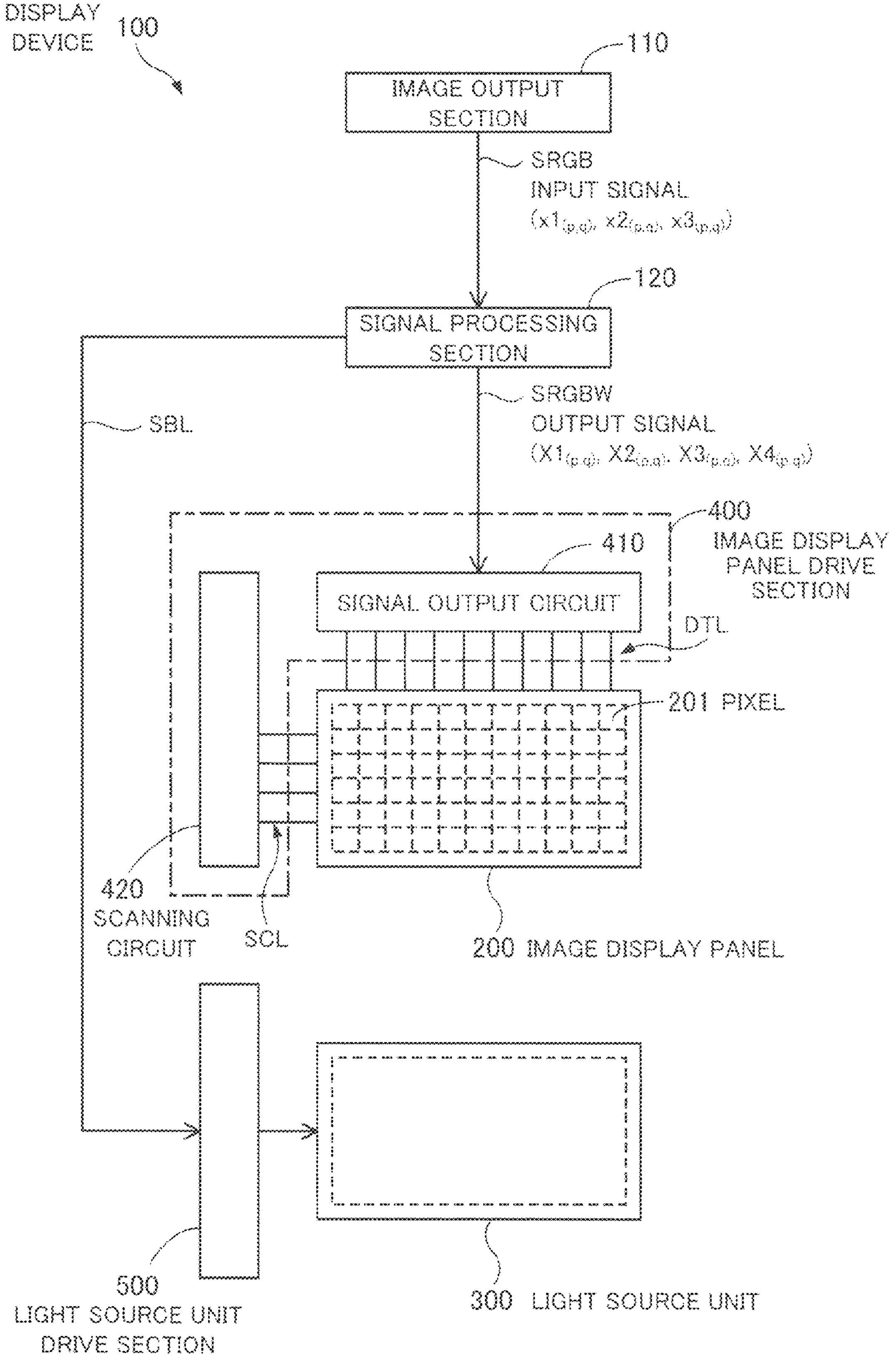
FIG. 34 illustrates an example of the structure of functions the display device has.

An example of the structure of functions the display device has will now be described. FIG. 34 illustrates an example of the structure of functions the display device has.

The display device 100 includes an image output section 110 and a signal processing section 120. An output signal SRGBW is inputted to an image display panel drive section 400 and a light source control signal SBL is inputted to a light source unit drive section 500. An image display panel 200 is inversion-driven.

The image output section 110 outputs an input signal SRGB (display gradation bit number is 8, for example) to the signal processing section 120. The input signal SRGB includes an input signal value x1(*p, q*) for a first primary color, an input signal value x2(*p, q*) for a second primary color, and an input signal value x3(*p, q*) for a third primary color. In the second embodiment it is assumed that the first primary color, the second primary color, and the third primary color are red, green, and blue respectively.

The signal processing section 120 supplies signals to the image display panel drive section 400 which drives the image display panel 200 and the light source unit drive section 500 which drives the light source unit 300. The signal processing section 120 determines according to the input signal SRGB an index for adjusting the luminance of each pixel of the image display panel 200 (or an index for reducing the luminance of the light source unit 300), calculates according to the index luminance information for the light source unit 300 according to pixels, makes an output signal SRGBW (display gradation bit number is 8, for example) reflect the luminance information, and controls image display by the light source unit 300. The output signal SRGBW includes an output signal value X4(*p, q*) for a fourth subpixel 202W which displays a fourth color, in addition to an output signal value X1(*p, q*) for a first subpixel 202R, an output signal value X2(*p, q*) for a second subpixel 202G, and an output signal value X3(*p, q*) for a third subpixel 202B. It is assumed that the fourth color is white.

The above processing operation of the signal processing section 120 is realized by the display driver IC 100*b*, the CPU 100*a*1, or the like illustrated in FIG. 34.

If the above processing operation of the signal processing section 120 is realized by the display driver IC 100*b*, an input signal SRGB is inputted to the display driver IC 100*b* via the CPU 100*a*1. The display driver IC 100*b* generates an output signal SRGBW and controls the image display panel 200. Furthermore, the display driver IC 100*b* generates a light source control signal SBL and transmits it to the light source unit driver IC 100*c* via the bus 100*f*.

If the above processing operation of the signal processing section 120 is realized by the CPU 100*a*1, the CPU 100*a*1 inputs an output signal SRGBW to the display driver IC 100*b*. Furthermore, the CPU 100*a*1 generates a light source control signal SBL and transmits it to the light source unit driver IC 100*c* via the bus 100*f*.

If the above processing functions are realized with a computer, a program in which the contents of the functions that the display device has are described is provided. By executing this program on the computer, the above processing functions are realized on the computer. This program may be recorded on a computer readable record medium.

A computer readable record medium may be a magnetic storage device, an optical disk, a magneto-optical recording medium, a semiconductor memory, or the like. A magnetic storage device may be a hard disk drive (HDD), a flexible disk (FD), a magnetic tape, or the like. An optical disk may be a digital versatile disc (DVD), a DVD-RAM (Random Access Memory), a compact disc read only memory (CD-ROM), a CD-R(Recordable)/RW(ReWritable), or the like. A magneto-optical recording medium may be a magneto-optical disk (MO) or the like.

To place the program on the market, portable record media, such as DVDs or CD-ROMs, on which it is recorded are sold. Alternatively, the program is stored in advance in a storage unit of a server computer and is transferred from the server computer to another computer via a network.

When a computer executes this program, it will store the program, which is recorded on a portable record medium or which is transferred from the server computer, in its storage unit, for example.

The computer then reads the program from its storage unit and performs processes in compliance with the program. The computer may read the program directly from a portable record medium and perform processes in compliance with the program. Furthermore, each time the program is transferred from the server computer connected via a network, the computer may perform processes in order in compliance with the program it receives.

In addition, at least a part of the above processing functions may be realized by an electronic circuit such as a digital signal processor (DSP), an application specific integrated circuit (ASIC), or a programmable logic device (PLD).

The above embodiments are given as examples of implementation in display devices adopting the RGBW system. The present invention is applicable not only to such display devices adopting the RGBW system but also to display devices adopting other techniques for controlling and reducing the luminance of a backlight by performing a gradation conversion process on an image signal. For example, a content adaptive backlight control (CABC) technique is one of such techniques for reducing power consumption. This CABC technique controls the ratio of the luminance of a backlight to the maximum luminance and gradation distribution setting of a display image according to the characteristic (gradation distribution) of the display image. A display device adopting the CABC technique may be provided with a conversion section for converting an input signal to a gradation distribution conversion signal according to the gradation distribution, an error dispersion section for converting the gradation distribution conversion signal to a display signal having less bits than the gradation distribution conversion signal to spatially disperse errors, and a display panel section for displaying an image on the basis of the display signal.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A display device comprising:

a conversion circuitry configured to generate a first data conversion signal including a first number of bits from a first input signal for a first color, and generate a second data conversion signal including the first number of bits from a second input signal for a second color;

an error dispersion circuitry configured to generate a first display control signal including a second number of bits that is smaller than the first number of bits from the first data conversion signal, generate a second display control signal including the second number of bits that is smaller than the first number of bits from the second data conversion signal, spatially disperse first errors that occur at a time of generating the first display control signal according to a first dither pattern, and spatially disperse second errors that occur at a time of generating the second display control signal according to a second dither pattern that is different from the first dither pattern; and a display panel circuitry configured to display an image on a basis of the first display control signal and the second display control signal.

2. The display device according to claim 1, wherein the conversion circuitry is further configured to generate the first data conversion signal including the first number of bits from the first input signal including a third number of bits which is larger than the first number of bits, and generate the second data conversion signal including the first number of bits from the second input signal including the third number of bits which is larger than the first number of bits.

3. The display device according to claim 1, wherein the error dispersion circuitry is configured to spatially disperse the first errors by changing pixel lighting patterns in blocks for each frame, the blocks each including M×M pixels, M being a positive integer.

4. The display device according to claim 3, wherein the error dispersion circuitry is configured to consider a pixel lighting pattern obtained by rotating a pixel lighting pattern of a block in a first frame by $\pi/2$ as a pixel lighting pattern of a block in a second frame.

5. The display device according to claim 3, wherein the error dispersion circuitry is configured to make a pixel lighting pattern of highest luminance subpixels differ from a pixel lighting pattern of second highest luminance subpixels in a block including the M×M pixels in a same frame.

6. The display device according to claim 5, wherein the error dispersion circuitry is configured to generate a pixel lighting pattern of green subpixels by rotating a pixel lighting pattern of white subpixels by $\pi$, or generate the pixel lighting pattern of the white subpixels by rotating the pixel lighting pattern of the green subpixels, in the block including the M×M pixels in the same frame.

7. A display device comprising:

a conversion circuitry configured to generate a data conversion signal including a first number of bits from an input signal;

an error dispersion circuitry configured to generate a display control signal including a second number of bits that is smaller than the first number of bits from the data conversion signal and spatially disperse errors that occur at a time of generating the display control signal; and a display panel circuitry configured to display an image on a basis of the display control signal, wherein the error dispersion circuitry is configured to disperses spatially the errors by changing pixel lighting patterns in blocks for each frame, the blocks each including M×M pixels, M being a positive integer, wherein when frame switching is performed with n frames as one cycle, n being a positive integer, the error dispersion circuitry is configured to make a pixel lighting pattern in a first cycle differ from a pixel lighting pattern in a second cycle, and make positions in the first cycle at which pixels light differ from positions in the second cycle at which pixels light.

8. A display device comprising:

a conversion circuitry configured to generate a data conversion signal including a first number of bits from an input signal;

an error dispersion circuitry configured to generate a display control signal including a second number of bits that is smaller than the first number of bits from the data conversion signal and spatially disperse errors that occur at a time of generating the display control signal;

an expansion coefficient calculation circuitry configured to analyze an input signal image including a first subpixel signal value for displaying a first primary color, a second subpixel signal value for displaying a second primary color, and a third subpixel signal value for displaying a third primary color, and calculate a first expansion coefficient for generating a fourth subpixel signal value for displaying a fourth color;

an expansion coefficient error dispersion circuitry configured to disperse errors that occur at a time of generating the first expansion coefficient, and generate a second expansion coefficient including bits whose number is smaller than a number of bits included in the first expansion coefficient;

a fourth subpixel generation circuitry configured to generate the fourth subpixel signal value on a basis of the second expansion coefficient; and a display panel circuitry configured to display an image on a basis of the display control signal.

9. The display device according to claim 1, wherein the conversion circuitry is configured to perform a first data conversion process and a second data conversion process so that a number of bits included in the first data conversion signal and the second data conversion signal after data conversion is greater than a number of input bits which is allowable in the display panel circuitry.

10. A display control method for a display device having a conversion circuitry, an error dispersion circuitry and a display panel circuitry, the method comprising:

generating, by the conversion circuitry, a first data conversion signal including a first number of bits from a first input signal for a first color;

generating, by the conversion circuitry, a second data conversion signal including the first number of bits from a second input signal for a second color;

generating, by the error dispersion circuitry, a first display control signal including a second number of bits that is smaller than the first number of bits from the first data conversion signal;

generating, by the error dispersion circuitry, a second display control signal including the second number of bits that is smaller than the first number of bits from the second data conversion signal, dispersing, by the error dispersion circuitry, spatially first errors that occur at a time of generating the first display control signal according to a first dither pattern;

dispersing, by the error dispersion circuitry, spatially second errors that occur at a time of generating the second display control signal according to a second dither pattern that is different from the first dither pattern; and displaying, by the display panel circuitry, an image on a basis of the first display control signal and the second display control signal.

11. A display device comprising:

a data conversion circuitry configured to calculate an expansion coefficient on a basis of an input signal including a first subpixel signal value, a second subpixel signal value, and a third subpixel signal value, calculate another expansion coefficient from the first subpixel signal value on a basis of the expansion coefficient, and generate, on a basis of said another expansion coefficient, a data conversion signal including a first number of bits and including the first subpixel signal value, the second subpixel signal value, the third subpixel signal value, and a fourth subpixel signal value;

an image analysis circuitry configured to generate, on the basis of the expansion coefficient, a luminance control signal for controlling luminance of a backlight;

an error dispersion circuitry configured to generate a display control signal including a second number of bits that is smaller than the first number of bits from the data conversion signal, and spatially disperse errors that occur at a time of generating the display control signal;

a display panel circuitry configured to display an image on a basis of the display control signal; and a backlight control circuitry configured to generate, on a basis of the luminance control signal, a drive signal for making the backlight emit light, and supply the drive signal to the backlight.

12. The display device according to claim 1, wherein the first color is green and the second color is white, and wherein the first dither pattern and the second dither pattern have π rotation relationship mutually.

* * * * *